(12) United States Patent
Elshafie et al.

(10) Patent No.: US 12,047,769 B2
(45) Date of Patent: Jul. 23, 2024

(54) ENHANCED SECURITY FOR WIRELESS COMMUNICATIONS

(71) Applicant: QUALCOMM Incorporated, San Diego, CA (US)

(72) Inventors: Ahmed Elshafie, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/392,020

(22) Filed: Aug. 2, 2021

(65) Prior Publication Data

US 2023/0030696 A1    Feb. 2, 2023

(51) Int. Cl.
*H04L 1/00* (2006.01)
*H04W 12/033* (2021.01)
*H04W 12/041* (2021.01)
*H04W 12/0431* (2021.01)

(52) U.S. Cl.
CPC ......... *H04W 12/041* (2021.01); *H04L 1/0063* (2013.01); *H04W 12/033* (2021.01); *H04W 12/0431* (2021.01)

(58) Field of Classification Search
CPC ............. H04W 12/041; H04W 12/033; H04W 12/0431; H04L 1/0063; H04L 1/004; H04L 1/0071; H04L 1/0061
See application file for complete search history.

(56) References Cited

U.S. PATENT DOCUMENTS

| 11,228,394 | B2* | 1/2022 | Chen | H04L 1/0042 |
| 2010/0067701 | A1* | 3/2010 | Patwari | H04L 9/0875 380/279 |
| 2014/0243037 | A1* | 8/2014 | Sikri | H04W 52/44 455/522 |
| 2020/0366317 | A1* | 11/2020 | Myung | H03M 13/1125 |
| 2020/0403728 | A1* | 12/2020 | Chen | H04L 1/0061 |
| 2021/0273651 | A1* | 9/2021 | Haftbaradaran | H03M 13/2792 |

\* cited by examiner

*Primary Examiner* — Carl G Colin
*Assistant Examiner* — Andrew Suh
(74) *Attorney, Agent, or Firm* — Holland & Hart LLP

(57) ABSTRACT

Methods, systems, and devices for wireless communications are described. In some examples, a wireless device may modify a cyclic redundancy check (CRC) generation and attachment operation based on a secret key to support enhanced security. In some examples, a first device may identify a set of data to transmit to a second device and prior to transmitting the set of data, the first device and the second device may obtain a set of key bits for data protection. The first device may generate a bit vector based on a subset of the set of key bits and a cyclic redundancy check polynomial. The transmitting device may then generate an encoded codeword based on the bit vector and transmit the encoded codeword to the second wireless device. The second device may decode the encoded codeword and obtain the set of data based on the set of key bits.

25 Claims, 16 Drawing Sheets

ENHANCED SECURITY FOR WIRELESS COMMUNICATIONS

FIELD OF TECHNOLOGY

The following relates to wireless communications, including enhanced security for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support enhanced security for wireless communications. Generally, the described techniques provide for modification of a cyclic redundancy check (CRC) generation or attachment operation based on cryptographic keys, which may provide enhanced security. For example, the cryptographic keys may be obtained using physical layer security techniques, the CRC generation or attachment operation may be performed at a physical layer, or both, and hence physical layer security may be obtained. In some examples, a transmitting device (e.g., a user equipment (UE) or a base station) may have pending data to transmit to a receiving device (e.g., a UE or a base station). Before transmitting the data, the transmitting device and the receiving device may obtain a key (e.g., symmetric key) for data protection. In some examples, the transmitting device and the receiving device may obtain the key using channel randomness and reciprocity.

The transmitting device may perform various types of processing on the data before transmitting the data over radio waves to the receiving device. For example, the transmitting device may perform a CRC generation and attachment procedure for the purpose of error detection. In some examples, the transmitting device may modify how the CRC is generated based on the key. For example, the transmitting device may use the key to initialize the CRC generator (e.g., pad the data with the key). In another example, the transmitter may generate the CRC and modify the generated CRC based on the key (e.g., interleave or mask the generated CRC). After the CRC generation and attachment procedure is complete, the transmitting device may then transmit the encrypted data to the receiving device, where the receiving device may decrypt the data based on the key. Using the techniques as described herein may allow a wireless communications system to support enhanced (e.g., physical layer) security. In some examples, the keys used for physical layer security may be more secure (e.g., less likely to be obtained by malicious devices), and may be capable of being updated at a faster rate, or both when compared to other data security techniques (e.g., upper layer security), among other benefits that may be appreciated by one of ordinary skill in the art.

A method for wireless communications at a first wireless device is described. The method may include obtaining a set of key bits for protecting a set of data bits, generating a bit vector based on at least a subset of the set of key bits and a CRC polynomial, generating an encoded codeword based on the bit vector, and transmitting the encoded codeword to a second wireless device.

An apparatus for wireless communications at a first wireless device is described. The apparatus may include a processor, memory coupled with the processor, and instructions stored in the memory. The instructions may be executable by the processor to cause the apparatus to obtain a set of key bits for protecting a set of data bits, generate a bit vector based on at least a subset of the set of key bits and a CRC polynomial, generate an encoded codeword based on the bit vector, and transmit the encoded codeword to a second wireless device.

Another apparatus for wireless communications at a first wireless device is described. The apparatus may include means for obtaining a set of key bits for protecting a set of data bits, means for generating a bit vector based on at least a subset of the set of key bits and a CRC polynomial, means for generating an encoded codeword based on the bit vector, and means for transmitting the encoded codeword to a second wireless device.

A non-transitory computer-readable medium storing code for wireless communications at a first wireless device is described. The code may include instructions executable by a processor to obtain a set of key bits for protecting a set of data bits, generate a bit vector based on at least a subset of the set of key bits and a CRC polynomial, generate an encoded codeword based on the bit vector, and transmit the encoded codeword to a second wireless device.

In some examples of the method, apparatuses, and non-transitory computer-readable medium described herein, generating the bit vector may include operations, features, means, or instructions for combining the set of data bits with at least the subset of key bits to obtain a set of input bits and using the CRC polynomial to obtain a set of parity bits based on the set of input bits, the bit vector including the set of parity bits.

In some examples of the method, apparatuses, and non-transitory computer-readable medium described herein, combining the set of data bits with at least the subset of key bits may include operations, features, means, or instructions for padding the set of data bits with at least the subset of key bits.

In some examples of the method, apparatuses, and non-transitory computer-readable medium described herein, the set of input bits may include one or more null bits.

In some examples of the method, apparatuses, and non-transitory computer-readable medium described herein, generating the bit vector may include operations, features, means, or instructions for using the CRC polynomial to obtain a set of parity bits based on the set of data bits and interleaving the set of parity bits with at least the subset of key bits.

In some examples of the method, apparatuses, and non-transitory computer-readable medium described herein, generating the bit vector may include operations, features, means, or instructions for using the CRC polynomial to obtain a set of parity bits based on the set of data bits and masking the set of parity bits using at least the subset of key bits.

In some examples of the method, apparatuses, and non-transitory computer-readable medium described herein, masking the set of parity bits using at least the subset of key bits may include operations, features, means, or instructions for applying an exclusive or (XOR) operation to the set of parity bits and at least the subset of key bits.

In some examples of the method, apparatuses, and non-transitory computer-readable medium described herein, generating the bit vector may include operations, features, means, or instructions for combining the set of data bits with the subset of key bits to obtain a set of input bits, using the CRC polynomial to obtain a set of parity bits based on the set of input bits, and interleaving the set of parity bits with a second subset of the set of key bits.

In some examples of the method, apparatuses, and non-transitory computer-readable medium described herein, generating the bit vector may include operations, features, means, or instructions for combining the set of data bits with the subset of key bits to obtain a set of input bits, using the CRC polynomial to obtain a set of parity bits based on the set of input bits, and masking the set of parity bits using a second subset of the set of key bits.

In some examples of the method, apparatuses, and non-transitory computer-readable medium described herein, obtaining the set of key bits may include operations, features, means, or instructions for determining one or more channel condition metrics for a channel between the first wireless device and the second wireless device, where a respective logic value of one or more key bits within the set of key bits may be based on the one or more channel condition metrics.

In some examples of the method, apparatuses, and non-transitory computer-readable medium described herein, generating the encoded codeword may include operations, features, means, or instructions for performing polar encoding on the bit vector.

A method for wireless communications at a second wireless device is described. The method may include obtaining a set of key bits associated with a set of data bits, receiving an encoded codeword from a first wireless device, obtaining a bit vector based on decoding the encoded codeword, and obtaining the set of data bits based on the bit vector, at least a subset of the set of key bits, and a CRC polynomial.

An apparatus for wireless communications at a second wireless device is described. The apparatus may include a processor, memory coupled with the processor, and instructions stored in the memory. The instructions may be executable by the processor to cause the apparatus to obtain a set of key bits associated with a set of data bits, receive an encoded codeword from a first wireless device, obtain a bit vector based on decoding the encoded codeword, and obtain the set of data bits based on the bit vector, at least a subset of the set of key bits, and a CRC polynomial.

Another apparatus for wireless communications at a second wireless device is described. The apparatus may include means for obtaining a set of key bits associated with a set of data bits, means for receiving an encoded codeword from a first wireless device, means for obtaining a bit vector based on decoding the encoded codeword, and means for obtaining the set of data bits based on the bit vector, at least a subset of the set of key bits, and a CRC polynomial.

A non-transitory computer-readable medium storing code for wireless communications at a second wireless device is described. The code may include instructions executable by a processor to obtain a set of key bits associated with a set of data bits, receive an encoded codeword from a first wireless device, obtain a bit vector based on decoding the encoded codeword, and obtain the set of data bits based on the bit vector, at least a subset of the set of key bits, and a CRC polynomial.

In some examples of the method, apparatuses, and non-transitory computer-readable medium described herein, obtaining the set of data bits may include operations, features, means, or instructions for combining the set of data bits with at least the subset of key bits to obtain a set of input bits and using the CRC polynomial and the set of parity bits to check the set of data bits for errors based on the set of input bits.

In some examples of the method, apparatuses, and non-transitory computer-readable medium described herein, combining the set of data bits with at least the subset of key bits may include operations, features, means, or instructions for padding the set of data bits with at least the subset of key bits.

In some examples of the method, apparatuses, and non-transitory computer-readable medium described herein, obtaining the set of data bits may include operations, features, means, or instructions for deinterleaving at least a portion of the bit vector to separate at least the subset of key bits from a set of parity bits and using the CRC polynomial and the set of parity bits to check the set of data bits for errors.

In some examples of the method, apparatuses, and non-transitory computer-readable medium described herein, obtaining the set of data bits may include operations, features, means, or instructions for unmasking at least a portion of the bit vector using at least the subset of key bits to obtain a set of parity bits and using the CRC polynomial and the set of parity bits to check the set of data bits for errors.

In some examples of the method, apparatuses, and non-transitory computer-readable medium described herein, unmasking the set of parity bits using at the subset of key bits may include operations, features, means, or instructions for applying an XOR operation to at least the portion of the bit vector and at least the subset of key bits.

In some examples of the method, apparatuses, and non-transitory computer-readable medium described herein, obtaining the set of data bits may include operations, features, means, or instructions for deinterleaving at least a portion of the bit vector to separate at least the subset of key bits from the set of parity bits, combining the set of data bits with at least a second subset of the set of key bits to obtain a set of input bits, and using the CRC polynomial and the set of parity bits to check the set of data bits for errors based on the set of input bits.

In some examples of the method, apparatuses, and non-transitory computer-readable medium described herein, obtaining the set of data bits may include operations, features, means, or instructions for unmasking at least a portion of the bit vector using at least the subset of key bits to obtain a set of parity bits, combining the set of data bits with at least a second subset of the set of key bits to obtain a set of input bits, and using the CRC polynomial and the set of parity bits to check the set of data bits for errors based on the set of input bits.

In some examples of the method, apparatuses, and non-transitory computer-readable medium described herein, obtaining the set of key bits may include operations, features, means, or instructions for determining one or more channel condition metrics for a channel between the first wireless device and the second wireless device, where a respective logic value of one or more key bits within the set of key bits may be based on the one or more channel condition metrics.

In some examples of the method, apparatuses, and non-transitory computer-readable medium described herein, obtaining the bit vector may include operations, features, means, or instructions for performing polar decoding on the bit vector.

DETAILED DESCRIPTION

Figure 1:
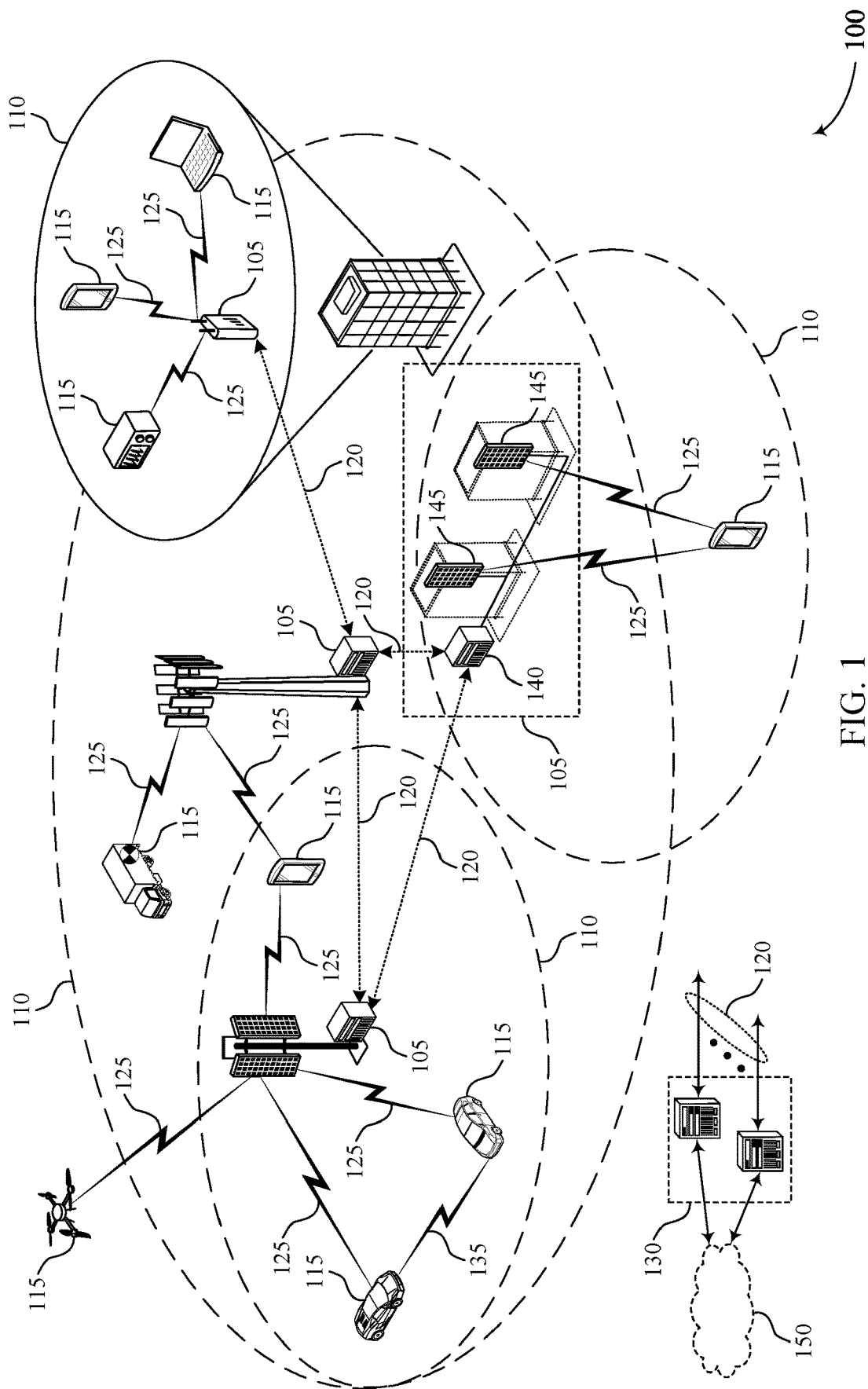
FIGS. 1 and 2 illustrate examples of a wireless communications system that supports enhanced security for wireless communications in accordance with aspects of the present disclosure.

In some examples, a wireless communications system may support the use of cryptographic keys to protect communications between wireless devices. If symmetric key encryption is used, a transmitting device may encrypt data using a secret key and the intended receiver may decrypt the data using the same secret key. In some examples, security measures may be present at the upper layers. In such examples, the transmitting device and the receiving device may obtain the secret key using upper layer cryptographic key algorithms such as Rivest-Shamir-Adleman (RSA), elliptic-curve cryptography (ECC), etc. Although upper layer security may offer various efficiencies, the secret key may be decipherable by other devices (e.g., unintended receivers) and additionally, the secret key change may be slow.

In some examples, as described herein, a wireless communications system may implement enhanced (e.g., physical layer) security measures. For example, the transmitting device and the receiving device may obtain the secret key from channel randomness. That is, the transmitting device and the receiving device may derive the secret key based on one or more channel condition metrics associated with a link between the transmitting device and the receiving device. Once the transmitting device derives the secret key, the transmitting device may modify a set of cyclic redundancy check (CRC) bits based on a set of secret key bits as part of an encoding process. CRC may provide error detection for a set of data bits. In one example, the transmitting device may combine the set of data bits with the secret key bits and generate the set of CRC bits based on the combination. As another example, the transmitting device may generate the set of CRC bits based on the set of data bits and interleave the resulting CRC bits with the set of secret key bits. Alternatively, the transmitting device may generate the set of CRC bits based on the set of data bits and mask the resulting set of CRC bits using the secret code bits. Two or more such techniques may also be used in combination. Using such techniques, a bit vector may be obtained, which the transmitting device may input into a polar encoder to generate an encoded codeword. The transmitting device may then transmit the encoded codeword to the receiver where the receiver may recover (e.g., decrypt) the data based on the secret key. In some cases, a CRC generation or attachment operation may be performed at the physical layer, and hence techniques as described herein may allow a wireless device to protect communications with enhanced security at the physical layer.

Aspects of the disclosure are initially described in the context of wireless communications systems. Additional aspects of the disclosure are described in the context of flow charts and process flows. Aspects of the disclosure are further illustrated by and described with reference to apparatus diagrams, system diagrams, and flowcharts that relate to enhanced security for wireless communications.

FIG. 1 illustrates an example of a wireless communications system 100 that supports enhanced security for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a wireless device (e.g., a UE 115 or a base station 105) may modify a CRC generation or attachment operation using cryptographic keys (e.g., as obtained using physical layer techniques). In some examples, a transmitting device (e.g., a UE 115 or a base station 105) may have pending data to transmit to a receiving device (e.g., a UE 115 or a base station 105). Before transmitting the data, the transmitting device and the receiving device may obtain a key (e.g., symmetric keys) for data protection. In some examples, the transmitting device and the receiving device may obtain the keys using channel randomness and reciprocity.

The transmitting device may perform some sort of processing on the data before transmitting the data over radio waves to the receiving device. For example, the transmitting device may perform a CRC generation and attachment procedure for the purpose of error protection. In some examples, the transmitting device may modify how the CRC is generated based on the key. For example, the transmitting device may use the key to initialize the CRC generator (e.g., pad the data with the key). In another example, the transmitter may generate the CRC and modify the generated CRC based on the key (e.g., interleave or mask the generated CRC). After the CRC generation and attachment procedure, the transmitting device may then transmit the encrypted data to the receiving device, where the receiving device may decrypt the data based on the key. Using the techniques as described herein may allow a wireless communications system to support enhanced (e.g., physical layer) security. In some examples, the keys used as described herein may be more secure (e.g., less likely to be obtained by malicious devices) and may changes at a faster rate when compared to other data security techniques (e.g., upper layer security).

Figure 2:
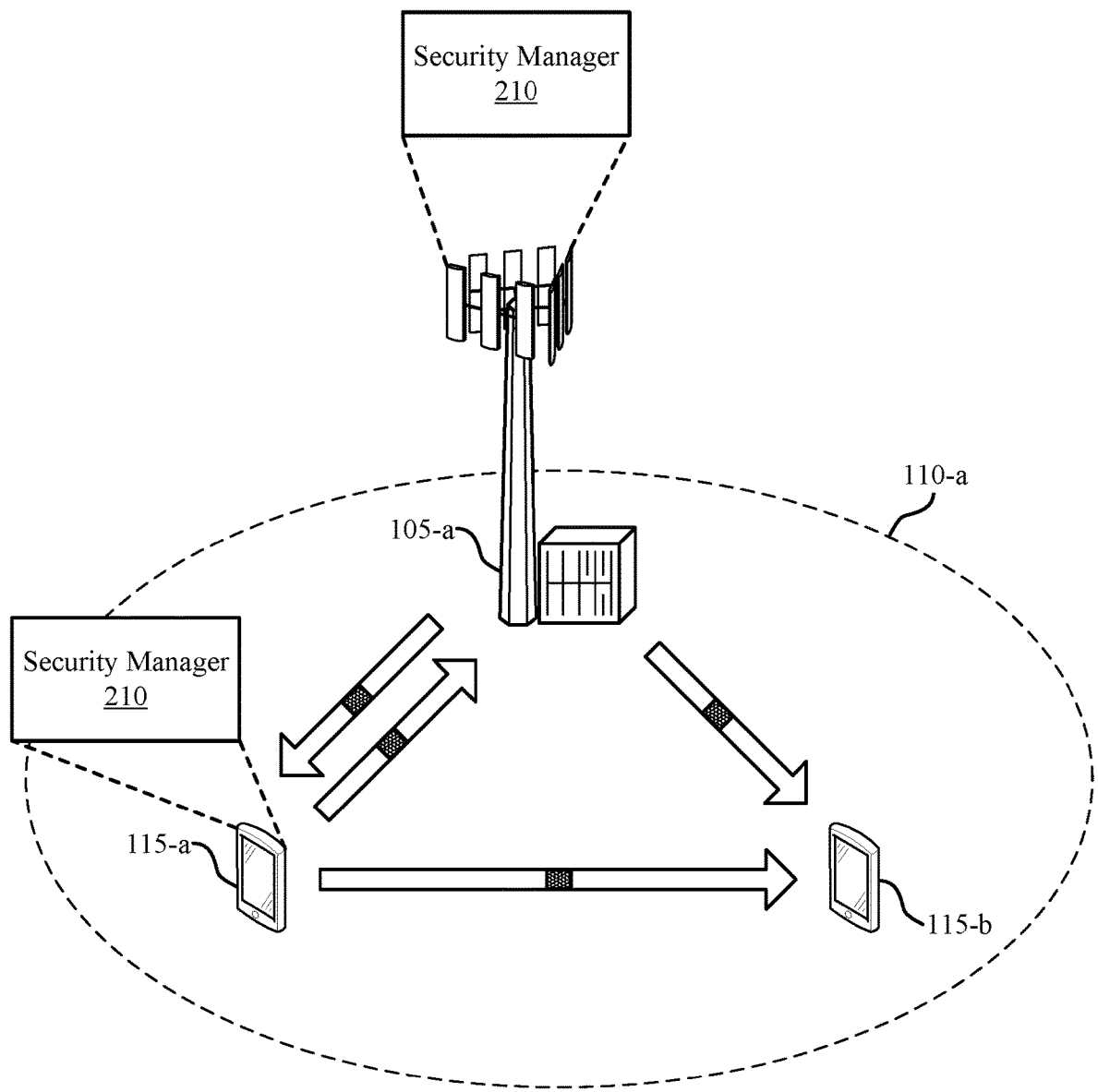

FIG. 2 illustrates an example of a wireless communications system 200 that supports enhanced security for wireless communications in accordance with aspects of the present disclosure. The wireless communications system 200 may include a base station 105-*a*, a UE 115-*a*, and a UE 115-*b*. In some examples, the wireless communications system 200 may implement aspects of a wireless communications system 100. For example, the base station 105-*a*, the UE 115-*a*, and the UE 115-*b* may be examples of a base station 105 and UEs 115 as described with reference to FIG. 1. The base station 105-*a*, the UE 115-*a*, and the UE 115-*b* may be located within a coverage area 110-*a* and may be examples of a receiving device or a transmitting device.

In some examples, the wireless communications system 200 may utilize secret keys (e.g., cryptographic keys) to protect data transmissions. A secret key may be described as a piece of information (e.g., string of bits) that is used to alter data such that only devices that have access to the secret key or a key associated with the secret key may decipher the data. Secret key algorithms may be symmetrical or asymmetrical. When utilizing asymmetric key algorithms, a transmitting device (e.g., a base station 105-*a* or a UE 115-*a*) may encrypt the data using a public key (e.g., key available to any device) and a receiving device (a base station 105-*a* or a UE 115-*a*) may decrypt the data using a private key (e.g., key known only to the receiving device and the transmitting device). When utilizing symmetric key algorithms, a transmitting device may use a secret key to encrypt the data and a receiving device may use the same secret key to decrypt the data. For example, the base station 105-*a* may be an example of transmitting device and the UE 115-*a* may be an example of an intended receiving device. The base station 105-*a* may encrypt data using a secret key and transmit the encrypted data to the UE 115-*a*. The UE 115-*a* may receive the encrypted data and use the same secret key to decrypt the data. In some examples, a UE 115-*b* (e.g., malicious device or unintended receiver) may eavesdrop while the base station 105-*a* communicates with the UE 115-*a* and as such, may receive the encrypted data from the base station 105-*a*. However, because the UE 115-*b* may not have knowledge of the secret key used to encrypt the data, the UE 115-*b* may not successfully decode the data.

In some examples, the wireless communications system 200 may implement upper layer data protection. That is, data protection that may be applied data at a transport layer, a session layer, a presentation layer, or an application layer of a protocol stack (e.g., open system interconnection (OSI) network model). A transmitting device or a receiving device (e.g., a UE 115-*a* or a base station 105-*a*) may obtain secret keys for upper layer data protection using RSA, ECC, etc. RSA may be described as a type of asymmetric key algorithm. Using RSA, the transmitting device may encrypt the data using a public key created using two prime numbers, where the prime number are kept secret (e.g., private key) and the receiving device may decrypt the data using the private key. ECC may also be described as an asymmetric key algorithm. Using ECC, a transmitting device may encrypt the data using a public key created using a starting point and an ending point of a curve, where the number of hops to get from the starting point to the ending point are kept secret (e.g., private key) and the receiving device may decrypt the data using the private key. Although upper layer data protection may be efficient, the secret key may be breakable by an eavesdropping device (e.g., UE 115-*b*) and the secret key change may be slow compared to other data protection techniques.

As another example, the wireless communications system 200 may implement physical layer data protection. That is, data protection that may be applied to data at a physical layer of the protocol stack (e.g., OSI network model). A transmitting device or a receiving device may obtain keys for physical layer data protection using channel reciprocity and randomness. Channel reciprocity and randomness may be described as a symmetric key algorithm. The receiving device and the transmitting device (e.g., a UE 115-*a* and the base station 105-*a*) may transmit reference signals to one another and determine channel metrics based on the reference signals, such as channel power, reference signal received power (RSRP), signal-to-interference-plus-noise ratio (SINR), or phase. The transmitting device and the receiving device may then quantize the metric to obtain the secret key. The transmitting device may encrypt the data using the secret key and the receiving device may decrypt the data using the secret key. That is, the transmitting device and the receiving device may utilize the secret key to secure transmissions (e.g., secure some fields within a physical channel such as information (e.g., synchronization signal blocks (SSBs), uplink control information (UCI), and downlink control information (DCI)) in a physical downlink control channel (PDCCH), a physical uplink control channel (PUCCH), a physical downlink shared channel (PDSCH) or a physical uplink shared channel (PUSCH)). In some examples, physical layer data protection may be more secure than upper layer data protection. This may be because a malicious device (e.g., UE 115-*b*) may require more computational power to determine physical layer secret keys than the upper layer secret keys. In addition, secret key changes using physical layer data protection may be faster than secret key changes using upper layer data protection.

As described herein, a transmitting device modify a CRC based on secret keys obtained via channel randomness to support physical layer data protection. Before a set of data bits may be transmitted on radio waves to the receiving device, the set of data bits may undergo some amount of processing. For example, when the set of data bits leaves the MAC layer, they may undergo CRC attachment. CRC may be described as an error detection method. During CRC attachment, a string of zeros may be appended to the set of data bits based on a CRC polynomial and binary division may be performed on the set of data bits and the string of zeros with the CRC polynomial to determine a set of parity bits. The set of data bits and the set of parity bits may then be inserted into a polar encoder to obtain an encoded codeword 205. The encoded codeword 205 is then transmitted to the receiving device, where the receiving device decodes the encoded codeword 205 and performs binary division on the codeword with the same CRC polynomial. The data bits are then checked by the receiving device for errors based on the resultant remainder.

In some examples, the transmitting device (e.g., the UE 115-*a* or the base station 105-*a*) may utilize a security manager 210 to modify the CRC generation and attachment procedure to provide physical layer data protection. In one example, the transmitting device and the receiving device (e.g., the UE 115-*a* or the base station 105-*a*) may obtain a set of key bits using channel randomness and the transmitting device may implement the security manager 210 to combine at least a portion of the set of key bits with the set of data bits. In some examples, combining at least the portion of the set of key bits with the set of data bits may include padding the set of data bits with at least the portion of the set of key bits. The transmitting device may then perform CRC generation on the combination. That is, binary division may be performed on the combination using a CRC polynomial to obtain a set of parity bits. The transmitting device may append the set of parity bits to the set of data bits resulting in a bit vector that includes the set of parity bits and the set of data bits. The transmitting device may then encode the bit vector (e.g., using polar encoding) to obtain an encoded codeword 205 and transmit the encoded codeword 205 to the receiving device. The receiving device may decode the encoded codeword 205 (e.g., using polar decoding) and obtain the bit vector including the set of data bits and the set of parity bits. The receiving device may parse through the bit vector and locate the set of data bits and combine the set of key bits with the set of data bits. The receiving device may then perform binary division on the combination using the CRC polynomial to determine whether the set of data bits has any errors.

In another example, the transmitting device and the receiving device (e.g., the UE 115-a or the base station 105-a) may obtain a set of key bits using channel randomness and the transmitting device may perform CRC attachment on the set of data bits. That is, binary division may be performed on the set of data bits using a CRC polynomial to obtain a set of parity bits. In some examples, the transmitting device may then implement the security manager 210 to interleave the set of parity bits with at least a portion of the set of key bits resulting in a bit vector that includes the set of parity bits, the set of data bits, and at least the portion of the set of key bits. Additionally or alternatively, in some examples, the set of data bits may not comprise a first target quantity of bits for purposes of parity bit generation (e.g., calculation), or the set of data bits and the set of parity bits may not collectively comprise a second target quantity of bits for purposes of interleaving or encoding. In some such examples, some or all of the key bits may be added to the set of data bits in order to achieve the first target quantity of bits prior to parity bit generation or the second target quantity of bits prior to interleaving or encoding. Additionally or alternatively, one or more null bits may be added to the set of data bits in order to achieve the first target quantity of bits or the second quantity of bits (e.g., if the added key bits still do not result in the relevant target quantity of bits being achieved).

Once the bit vector is obtained, the transmitting device may then encode the bit vector (e.g., using polar encoding) to obtain an encoded codeword 205 and transmit the encoded codeword 205 to the receiving device. The receiving device may decode the encoded codeword 205 (e.g., using polar decoding) and obtain the bit vector including the set of data bits, the set of parity bits. and at least a portion of the set of key bits. The receiving device may then deinterleave at least a portion of the bit vector to separate at least the portion of the set of key bits from the set of parity bits and perform binary division on the set of parity bits and the set of data bits using the CRC polynomial to check the set of data bits for errors.

In another example, the transmitting device and the receiving device (e.g., the UE 115-a or the base station 105-a) may obtain a set of key bits using channel randomness and the transmitting device may perform CRC attachment on the set of data bits. That is, binary division may be performed on the set of data bits using a CRC polynomial to obtain a set of parity bits. The transmitting device may then implement the security manager 210 to mask the set of parity bits using at least a portion of the set of key bits resulting in a bit vector. In some examples, the transmitting device may perform an exclusive or (XOR) operation on the set of parity bits and at least the portion of the set of keys bits to mask the set of parity bits with at least the portion of the set of key bits. The transmitting device may then encode the bit vector (e.g., using polar encoding) to obtain an encoded codeword 205 and transmit the encoded codeword 205 to the receiving device. The receiving device may decode the encoded codeword 205 (e.g., using polar decoding) and obtain the bit vector. The receiving device may then unmask at least a portion of the bit vector to obtain the set of parity bits and perform binary division on the set of parity bits and the set of data bits using the CRC polynomial to check the set of data bits for errors.

In some examples, the transmitting device may modify the CRC generation and attachment procedure using a combination of the method as described above. For example, the receiving device and the transmitting device (e.g., the UE 115-a or the base station 105-a) may obtain a set of key bits via channel randomness and split the set of key bits into two or more subsets of key bits. For example, the transmitting device and the receiving device may split the set of key bits into a first subset of key bits and a second subset of key bits. The transmitting device may implement security manager 210 to combine the first subset of key bits with a set of data bits and perform CRC attachment on the combination. That is, binary division may be performed on the combination using a CRC polynomial to obtain a set of parity bits. The transmitting device may then implement security manager 210 to mask the set of parity bits using the second subset of keys or interleave the set of parity bits with the second subset of keys bits resulting in a bit vector. The transmitting device may then encode the bit vector (e.g., using polar encoding) to obtain an encoded codeword 205 and transmit the encoded codeword 205 to the receiving device. The receiving device may decode the encoded codeword 205 (e.g., using polar decoding) and obtain the bit vector. The receiving device may then unmask or deinterleave at least a portion of the bit vector to obtain the set of parity bits using the second subset of key bits, combine the set of data bits with the first subset of key bits and perform binary division on the set of parity bits and the combination to check the set of data bits for errors.

Figure 3A:
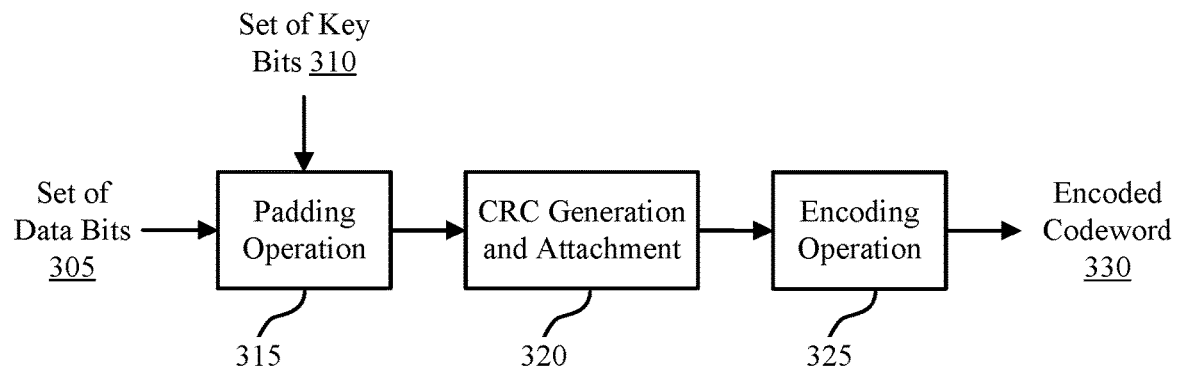
FIGS. 3A, 3B, 4A, and 4B illustrate examples of a flowchart that supports enhanced security for wireless communications in accordance with aspects of the present disclosure.
Figure 3B:
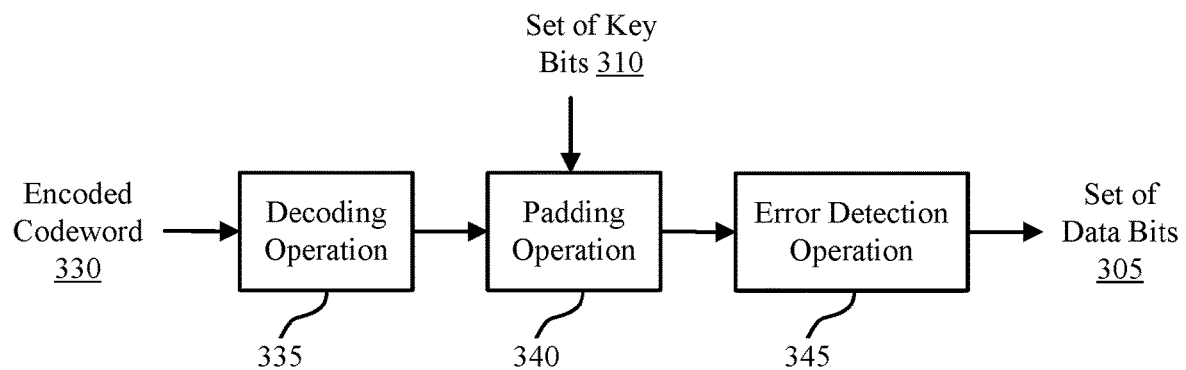

FIGS. 3A and 3B illustrate examples of a flowchart 300 (e.g., a flowchart 300-a and a flowchart 300-b) that supports enhanced security for wireless communications in accordance with aspects of the present disclosure. In some examples, the flowchart 300-a and the flowchart 300-b may implement aspects of a wireless communications system 100 and a wireless communications system 200. For example, the flowchart 300-a and the flowchart 300-b may be implemented by a UE 115 or a base station 105 as described with reference to FIGS. 1 and 2.

FIG. 3A illustrates an example of a flowchart 300-a that supports enhanced security for wireless communications in accordance with aspects of the present disclosure. In some examples, the flowchart 300-a may be implemented by a transmitting device (e.g., a UE or a base station). As described with reference to FIG. 2, a transmitting device may modify CRC generation and attachment operations based on secret keys (e.g., cryptographic keys) obtained via channel randomness to provide physical layer data protection.

In some examples, the transmitting device may identify pending data to transmit to a receiving device (e.g., a UE or a base station). For example, the transmitting device may identify a set of data bits 305, where the set of data bits may be denoted by $a_1, a_2, a_3, \ldots a_n$. Additionally, the transmitting device may obtain a set of key bits 310, where the set of key bits 310 may be denoted by $s_1, s_2, s_3, \ldots s_n$. In some examples, the transmitting device may obtain the set of key bits 310 using channel randomness. That is, the transmitting device may utilize the channel conditions associated with a communication link between the transmitting device and the receiving device to determine the set of key bits 310.

Before transmitting the set of data bits 305 over radio waves to the receiving device, the set of data bits may undergo multiple processing steps. For example, at 315, the transmitting device may undergo a combining operation. During the combining operation, the set of data bits 305 may be combined with the set of key bits 310. As one example of the combining operation, the set of data bits 305 may be padded with the set of key bits 310. In some examples, the set of key bits 310 may be located before the set of data bits 305 (e.g., resulting in a bit string of $s_1, s_2, s_3, \ldots s_n, a_1, a_2,$ $a_3, \ldots a_n$) or the set of key bits 310 may be located after the set of data bits 305 (e.g., resulting in a bit string of $a_1, a_2, a_3, \ldots a_n, s_2, s_3, \ldots s_n$).

At 320, the combination of the set of key bits 310 and the set of data bits 305 may undergo CRC generation and attachment. During CRC generation, the transmitter may utilize a generator polynomial (e.g., $g_{crc24C}(D)$) to obtain a set of parity bits based on the set of key bits 310 and the set of data bits 305. In some examples, the set of parity bits may have bit length of 24 bits. The set of parity bits may be appended to the set of data bits 305 resulting in a bit vector—that is, the bit vector may include the set of data bits 305 and the parity bits, where the parity bits were generated based on a combination of the set of data bits and the set of key bits 310. The bit vector may be denoted by $b_1, b_2, b_3, \ldots b_n$.

At 325, the bit vector may undergo an encoding operation to obtain a encoded codeword. In some examples, the bit vector may be inputted into a polar encoder. Polar coding may involve assigning bits to different bit channels, and encoding the bits such that certain bit channels (e.g., polar channels) are polarized to increased reliability, while other bit channels are polarized to decrease in reliability. The bit channels may be sorted by reliability, such as most reliable bit channel to least reliable bit channel. Once the encoding operation is complete, the transmitting device may transmit the encoded codeword 330 to the receiving device.

FIG. 3B illustrates an example of a flowchart 300-b that supports enhanced security for wireless communications in accordance with aspects of the present disclosure. In some examples, the flowchart 300-b may be implemented by a receiving device (e.g., a UE or a base station). The receiving device may obtain a set of key bits 310, where the set of key bits 310 are denoted by $s_1, s_2, s_3, \ldots s_n$. In some examples, the receiving device may obtain the set of key bits 310 using channel randomness. That is, the receiving device may utilize the channel conditions associated with a communication link between a transmitting device (e.g., a base station or a UE) and a receiving device to determine the set of key bits 310.

In some examples, the receiving device may receive an encoded codeword from the transmitting device and at 330, the receiving device may perform a decoding operation on the encoded codeword to obtain a bit vector. The bit vector may include a set of parity bits and a set of data bits 305. In some examples, the encoded codeword may have been encoded using polar encoding as described in FIG. 3A and as such, the receiving device may perform polar decoding on the encoded codeword to obtain the bit vector.

At 340, the receiving device may parse through the bit vector to locate the set of data bits 305 and combine the set of data bits 305 with the set of key bits 310. In some examples, the receiving device may be able to differentiate between the set of data bits 305 and the set of parity bits of the bit vector because the data bits, the parity bits, or both may have a set bit length (e.g., 24 parity bits) and a set location within the bit vector (e.g., the set of data bits 305 may come before or after the set of parity bits). Combining the set of data bits 305 with the set of key bits 310 may involve padding the set of data bits 305 with the set of key bits 310. In some examples, the set of data bits 305 may be located before the set of key bits 310 or the set of data bits 305 may be located after the set of key bits 310.

At 345, the combination of the set of key bits 310 and the set of data bits 305 may undergo an error detection operation. That is, the set of data bits 305 may be checked for errors using the same CRC polynomial as was used at the transmitting device and the set of parity bits. If no errors are detected than the receiving device may receive the set of data bits 305.

Figure 4A:
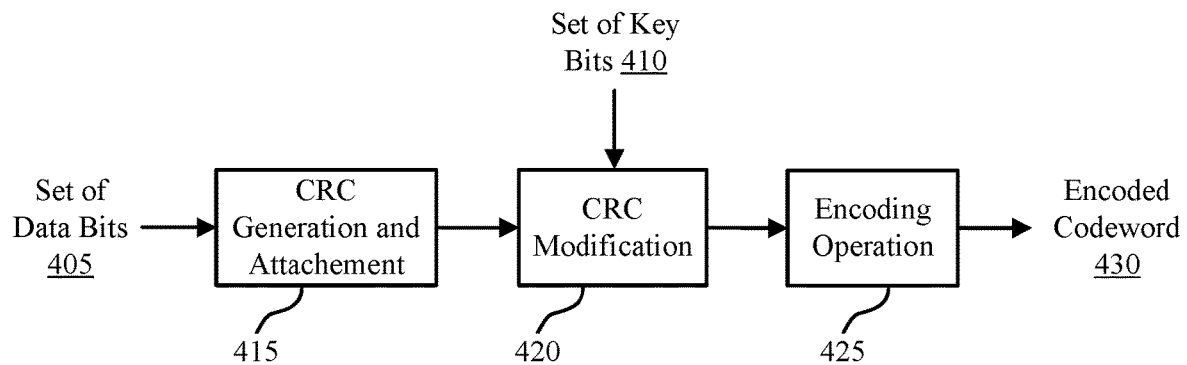
Figure 4B:
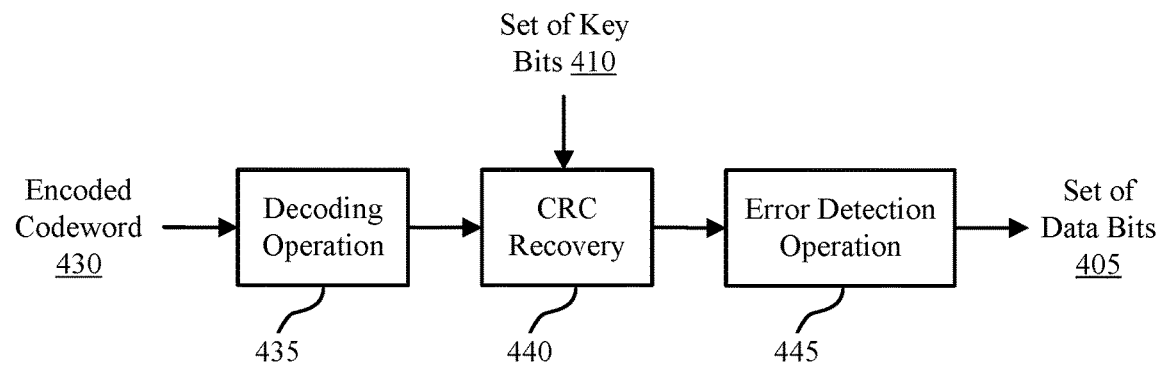

FIGS. 4A and 4B illustrate examples of a flowchart 400 (e.g., a flowchart 400-a and a flowchart 400-b) that supports enhanced security for wireless communications in accordance with aspects of the present disclosure. In some examples, the flowchart 400-a and the flowchart 400-b may implement aspects of a wireless communications system 100 and a wireless communications system 200. For example, the flowchart 400-a and the flowchart 400-b may be implemented by a UE 115 or a base station 105 as described with reference to FIGS. 1 and 2.

FIG. 4A illustrates an example of a flowchart 400-a that supports enhanced security for wireless communications in accordance with aspects of the present disclosure. In some examples, the flowchart 400-a may be implemented by a transmitting device (e.g., a UE or a base station). As described with reference to FIG. 2, the transmitting device may modify CRC generation and attachment operations based on secret keys obtained via channel randomness to provide physical layer data protection.

In some examples, the transmitting device may identify pending data to transmit to a receiving device. For example, the transmitting device may identify a set of data bits 305, where the set of data bits may be denoted by $a_1, a_2, a_3, a_n$.

Before transmitting the set of data bits 405 over radio waves to the receiving device, the set of data bits may undergo multiple processing steps. For example, at 415, the set of data bits 405 may undergo CRC generation and attachment. During CRC generation, the transmitter may utilize a generator polynomial (e.g., $g_{crc24C}(D)$) to obtain a set of parity bits based on the set of data bits 405. In some examples, the set of parity bits may include 24 bits. The set of parity bits may be appended to the set of data bits 305.

In some examples, the transmitting device may obtain a set of key bits 310, where the set of key bits 410 are denoted by $s_1, s_2, s_3, \ldots s_n$. In some examples, the transmitting device may obtain the set of key bits 410 using channel randomness. That is, the transmitting device may utilize the channel conditions associated with a communication link between the transmitting device and the receiving device (e.g., a UE or a base station) to determine the set of key bits 410.

At 425, the transmitting device may modify the CRC using the set of key bits 410. As one example, the transmitting device may interleave the set of parity bits with the set of key bits 410 to obtain a set of interleaved bits. That is, one or more of the set of key bits 410 may be inserted between one or more parity bits. As another example, the transmitting device may mask the set of parity bits with the set of key bits 410. For example, the transmitting device may perform an XOR operation on the parity bits and the set of key bits 410 to obtain a set of masked bits. Performing CRC modification at 425 may result in a bit vector that includes the modified CRC (e.g., masked or interleaved bits) and the set of data bits. The bit vector may be denoted by $b_1, b_2, b_3, \ldots b_n$.

At 430, the bit vector may undergo an encoding operation to obtain a encoded codeword. In some examples, the bit vector may be inputted into a polar encoder. Polar coding may involve assigning bits to different bit channels, and encoding the bits such that certain bit channels (e.g., polar channels) are polarized to increased reliability, while other bit channels are polarized to decrease in reliability. The bit channels may be sorted by reliability, such as most reliable bit channel to least reliable bit channel. Once the encoding operation is complete, the transmitting device may transmit the encoded codeword 430 to the receiving device.

FIG. 4B illustrates an example of a flowchart 400-b that supports enhanced security for wireless communications in accordance with aspects of the present disclosure. In some examples, the flowchart 400-b may be implemented at a receiving device (e.g., a base station or a UE). The receiving device may obtain a set of key bits 310, where the set of key bits 310 are denoted by $s_1, s_2, s_3, \ldots s_n$. In some examples, the receiving device may obtain the set of key bits 310 using channel randomness. That is, the receiving device may utilize the channel conditions associated with a communication link between the transmitting device and a receiving device to determine the set of key bits 310.

In some examples, the receiving device may receive an encoded codeword from the transmitting device and at 330, the receiving device may perform a decoding operation on the encoded codeword to obtain a bit vector. The bit vector may include a set of parity bits and a set of data bits 305. In some examples, the encoded codeword may have been encoded using polar encoding as described in FIG. 4A and as such, the receiving device may perform polar decoding on the encoded codeword 430 to obtain the bit vector.

At 440, the receiving device may perform CRC recovery on at least a portion of the bit vector. As one example, CRC recovery may involve deinterleaving at least a portion of the bit vector to separate the set of parity bits from the set of key bits 410. As another example, CRC recovery may involve unmasking at least a portion of the bit vector to obtain a set of parity bits using the set of key bits 410. Unmasking may involve applying an XOR operation to at least a portion of the bits vector using the set of key bits 410 to obtain the set of parity bits.

At 445, the set of data bits 405 may undergo an error detection operation. That is, the set of data bits 405 is checked for errors using the same CRC polynomial as was used at the transmitting device and the set of parity bits. If no errors are detected than the receiving device may receive the set of data bits 405.

Figure 5:
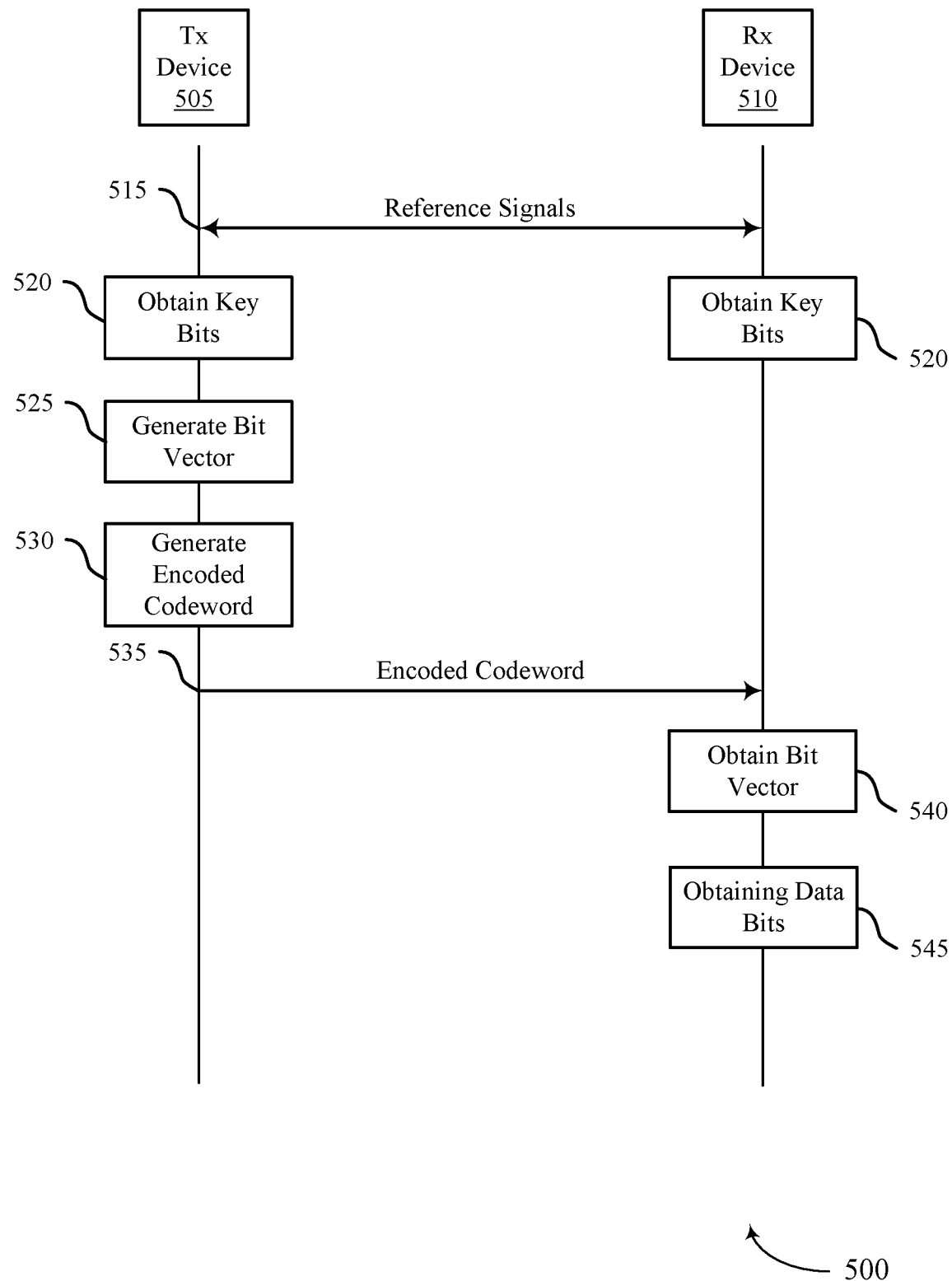
FIG. 5 illustrates an example of a process flow that supports enhanced security for wireless communications in accordance with aspects of the present disclosure.

FIG. 5 illustrates an example of a process flow 500 that supports enhanced security for wireless communications in accordance with aspects of the present disclosure. In some examples, the process flow 500 may implement or be implemented by aspects of a wireless communications system 100, a wireless communications system 200, a flowchart 300, and a flowchart 400. For example, the process flow 500 may be implemented by a UE 115 or a base station 105 as described with reference to FIGS. 1 and 2. Alternative examples of the following may be implemented, where some steps are performed in a different order then described or are not performed at all. In some cases, steps may include additional features not mentioned below, or further steps may be added.

At 515, a transmitting device 505 and a receiving device 510 may exchange reference signals. In some examples, the transmitting device 505 and the receiving device 510 may utilize the reference signals to determine channel metrics (e.g., channel power, RSRP, SINR, phase, etc.).

At 520, the transmitting device 505 and the receiving device 510 may obtain a key for data protection. In some examples, the transmitting device 505 and the receiving device 510 may obtain the key using channel randomness. That is, the transmitting device 505 and the receiving device 510 may determine the key based on the channel metrics (quantized values of the channel metrics) determined at 515.

In some examples, the transmitting device 505 may identify a set of data bits to transmit to the receiving device 510 and may perform some processing on the set of data bit to prepare the set of data for transmission.

At 525, as part of the processing, the transmitting device 505 may generate a bit vector. In one example, generating the bit vector may involve combining the set of data bits with a set of key bits (e.g., bits that represent the key obtained 520) and inputting the combination into a CRC generator to obtain a set of parity bits, where the bit vector includes the set of data bits and the parity bits. As another example, generating the bit vector may include inputting the set of data bits into a CRC generator to obtain a set of parity bits and interleaving the set of parity bits with a set of keys bits, where the bit vector includes the interleaved bits and the set of data bits. Alternatively, generating the bit vector may include inputting the set of data bits into a CRC generator to obtain a set of parity bits and masking the set of parity bits using a set of keys bits, where the bit vector includes the masked bits and the set of data bits.

In some examples, a combination of the above options may be implemented. For example, generating the bit vector may involve combining the set of data bits with a first subset of the set of key bits, inputting the combination into a CRC generator to obtain a set of parity bits, and either interleaving the set of parity bits with a second subset of the set of key bits or masking the set of parity bits using the second subset of the set of key bits.

At 530, the transmitting device 505 may generate an encoded codeword based on the bit vector. For example, the transmitting device 505 may input the bit vector into a polar encoder to obtain the encoded codeword. At 535, the transmitting device 505 may transmit the encoded codeword to the receiving device 510.

At 540, the receiving device 510 may receive and decode the encoded codeword to obtain the bit vector. In some examples, the codeword may be encoded via polar encoding and as such, the receiving device 510 may utilize polar decoding to obtain the bit vector.

At 545, the receiving device 510 may obtain the set of data bits based on the set of keys bits obtained at 520. If combining is used at 525, obtaining the set of data bits may involve parsing through the bit vector to find the set of data bits within the bit vector, combining the set of data bits with the set of key bit, and using a CRC polynomial and the parity bits to check the set of data bits for errors. If interleaving is used at 525, obtaining the set of data bits may involve deinterleaving a portion of the bit vector to separate the set of key bits from the parity bits and using a CRC polynomial and the set of parity bits to check the set of data bits for errors. If masking is used at 525, obtaining the set of data bits may involve unmasking a portion of the bit vector using the set of key bits to obtain the set of parity bits and using a CRC polynomial and the set of parity bits to check the set of data bits for errors.

Figure 6:
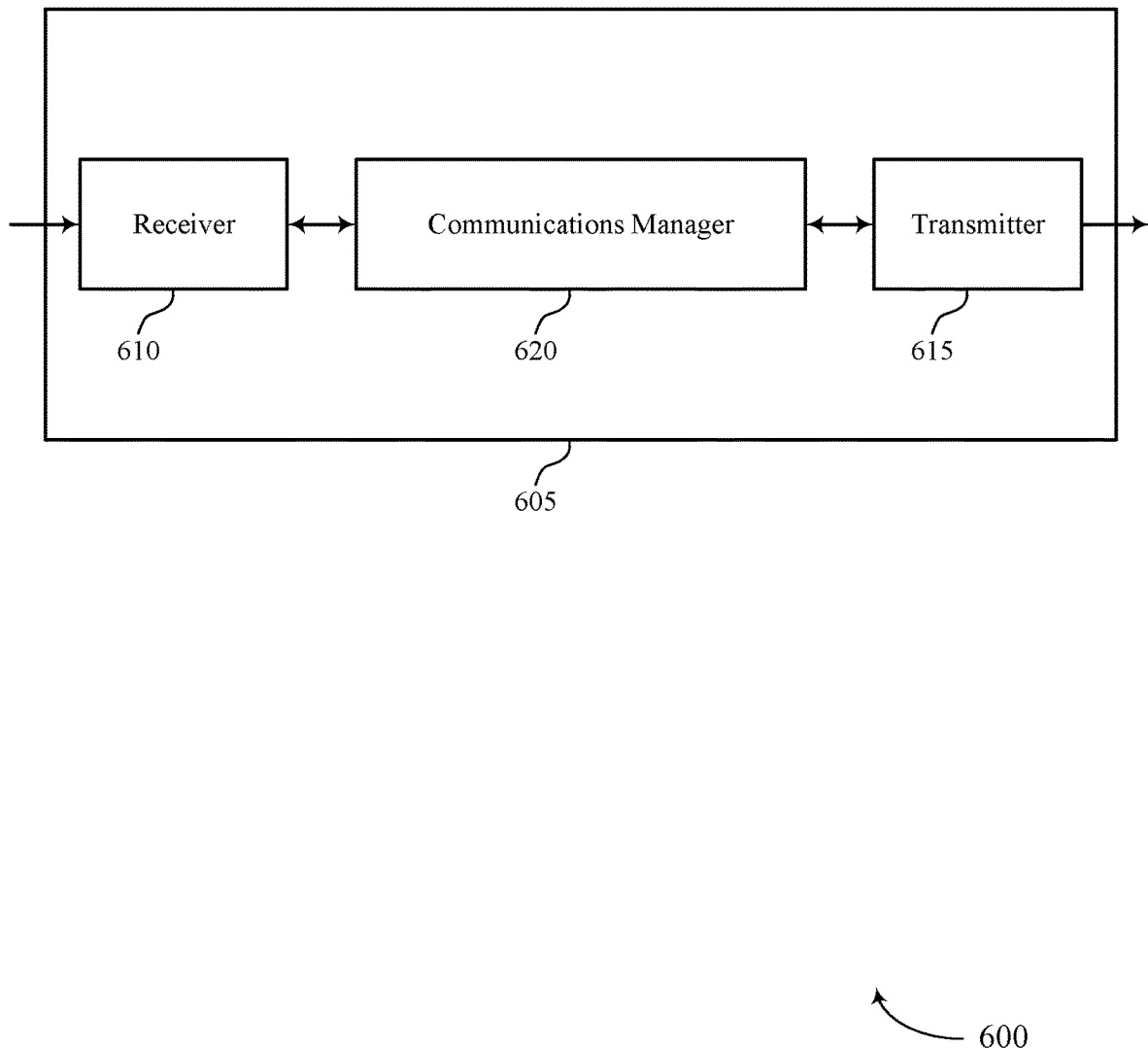
FIGS. 6 and 7 show block diagrams of devices that support enhanced security for wireless communications in accordance with aspects of the present disclosure.

If a combination of combining and interleaving or masking is used, obtaining the set of data may involve deinterleaving a portion of the bit vector to separate the second subset of the set of key bits from the parity bits using a CRC polynomial or unmasking the portion of the bit vector using the second subset of the set of keys to obtain the parity bits, combining the set of data bits with the first subset of the set of key bits, and using a CRC polynomial and the set of parity bits to check the set of data bits for errors FIG. 6 shows a block diagram 600 of a device 605 that supports enhanced security for wireless communications in accordance with aspects of the present disclosure. The device 605 may be an example of aspects of a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced security for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced security for wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of enhanced security for wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device (e.g., a transmitting device such as a base station or a UE) in accordance with examples as disclosed herein. For example, the communications manager 620 may be configured as or otherwise support a means for obtaining a set of key bits for protecting a set of data bits. The communications manager 620 may be configured as or otherwise support a means for generating a bit vector based on at least a subset of the set of key bits and a CRC polynomial. The communications manager 620 may be configured as or otherwise support a means for generating an encoded codeword based on the bit vector. The communications manager 620 may be configured as or otherwise support a means for transmitting the encoded codeword to a second wireless device.

Additionally or alternatively, the communications manager 620 may support wireless communications at a second wireless device (e.g., a receiving device such as a base station or a UE) in accordance with examples as disclosed herein. For example, the communications manager 620 may be configured as or otherwise support a means for obtaining a set of key bits associated with a set of data bits. The communications manager 620 may be configured as or otherwise support a means for receiving an encoded codeword from a first wireless device. The communications manager 620 may be configured as or otherwise support a means for obtaining a bit vector based on decoding the encoded codeword. The communications manager 620 may be configured as or otherwise support a means for obtaining the set of data bits based on the bit vector, at least a subset of the set of key bits, and a CRC polynomial.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing. The methods as described herein may support enhanced (e.g., physical layer) security. Enabling such security may reduce the need for additional security techniques such as upper layer security which may reduce processing at the device 605. Additionally, when enabling enhanced security as described herein, the device 605 may obtain cryptographic keys from channel metrics (e.g., channel randomness) as opposed to using more complicated algorithms such as RSA and ECC which may further reduce processing at the device 605.

Figure 7:
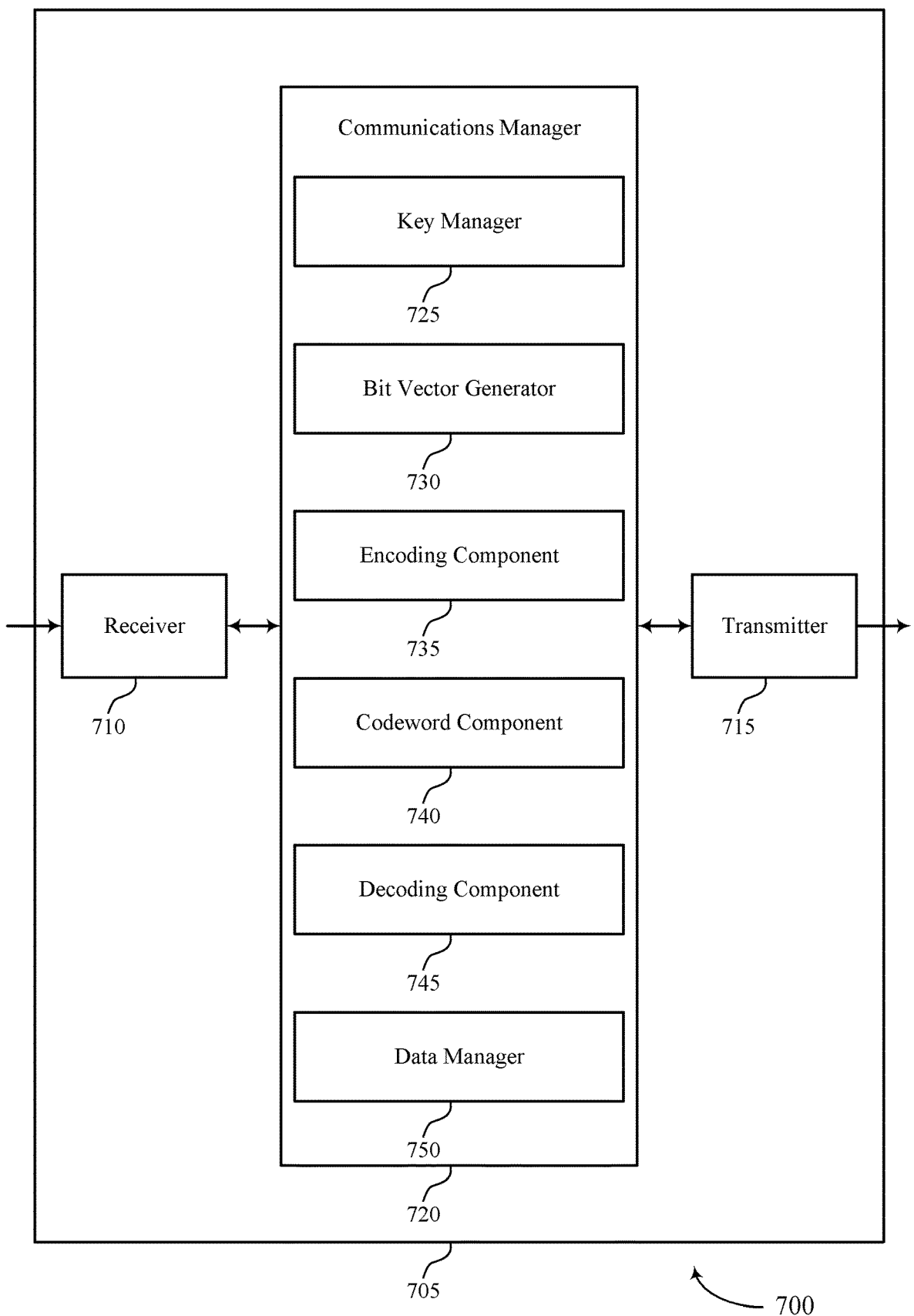

FIG. 7 shows a block diagram 700 of a device 705 that supports enhanced security for wireless communications in accordance with aspects of the present disclosure. The device 705 may be an example of aspects of a device 605, a UE 115, or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhanced security for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhanced security for wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of enhanced security for wireless communications as described herein. For example, the communications manager 720 may include a key manager 725, a bit vector generator 730, an encoding component 735, a codeword component 740, a decoding component 745, a data manager 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device (e.g., a transmitting device such as a base station or a UE) in accordance with examples as disclosed herein. The key manager 725 may be configured as or otherwise support a means for obtaining a set of key bits for protecting a set of data bits. The bit vector generator 730 may be configured as or otherwise support a means for generating a bit vector based on at least a subset of the set of key bits and a CRC polynomial. The encoding component 735 may be configured as or otherwise support a means for generating an encoded codeword based on the bit vector. The codeword component 740 may be configured as or otherwise support a means for transmitting the encoded codeword to a second wireless device.

Additionally or alternatively, the communications manager 720 may support wireless communications at a second wireless device (e.g., a receiving device such as a base station or a UE) in accordance with examples as disclosed herein. The key manager 725 may be configured as or otherwise support a means for obtaining a set of key bits associated with a set of data bits. The codeword component 740 may be configured as or otherwise support a means for receiving an encoded codeword from a first wireless device. The decoding component 745 may be configured as or otherwise support a means for obtaining a bit vector based on decoding the encoded codeword. The data manager 750 may be configured as or otherwise support a means for obtaining the set of data bits based on the bit vector, at least a subset of the set of key bits, and a CRC polynomial.

Figure 8:
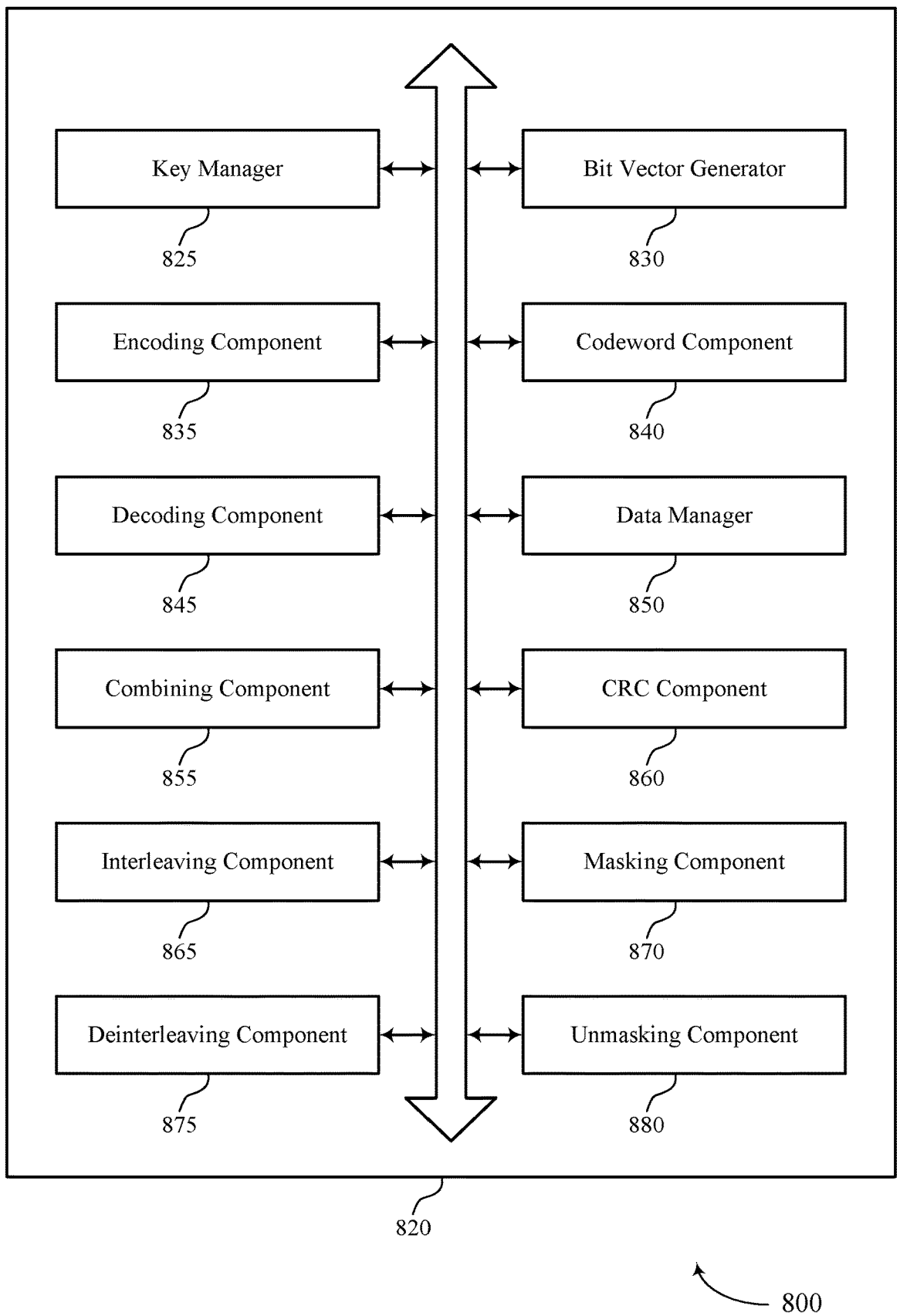
FIG. 8 shows a block diagram of a communications manager that supports enhanced security for wireless communications in accordance with aspects of the present disclosure.

FIG. 8 shows a block diagram 800 of a communications manager 820 that supports enhanced security for wireless communications in accordance with aspects of the present disclosure. The communications manager 820 may be an example of aspects of a communications manager 620, a communications manager 720, or both, as described herein. The communications manager 820, or various components thereof, may be an example of means for performing various aspects of enhanced security for wireless communications as described herein. For example, the communications manager 820 may include a key manager 825, a bit vector generator 830, an encoding component 835, a codeword component 840, a decoding component 845, a data manager 850, a combining component 855, an CRC component 860, an interleaving component 865, a masking component 870, a deinterleaving component 875, an unmasking component 880, or any combination thereof. Each of these components may communicate, directly or indirectly, with one another (e.g., via one or more buses).

The communications manager 820 may support wireless communications at a first wireless device (e.g., a transmitting device such as a base station or a UE) in accordance with examples as disclosed herein. The key manager 825 may be configured as or otherwise support a means for obtaining a set of key bits for protecting a set of data bits. The bit vector generator 830 may be configured as or otherwise support a means for generating a bit vector based on at least a subset of the set of key bits and a CRC polynomial. The encoding component 835 may be configured as or otherwise support a means for generating an encoded codeword based on the bit vector. The codeword component 840 may be configured as or otherwise support a means for transmitting the encoded codeword to a second wireless device.

In some examples, to support generating the bit vector, the combining component 855 may be configured as or otherwise support a means for combining the set of data bits with at least the subset of key bits to obtain a set of input bits. In some examples, to support generating the bit vector, the CRC component 860 may be configured as or otherwise support a means for using the CRC polynomial to obtain a set of parity bits based on the set of input bits, the bit vector including the set of parity bits.

In some examples, to support combining the set of data bits with at least the subset of key bits, the combining component 855 may be configured as or otherwise support a means for padding the set of data bits with at least the subset of key bits. In some examples, the set of input bits may include one or more null bits.

In some examples, to support generating the bit vector, the CRC component 860 may be configured as or otherwise support a means for using the CRC polynomial to obtain a set of parity bits based on the set of data bits. In some examples, to support generating the bit vector, the interleaving component 865 may be configured as or otherwise support a means for interleaving the set of parity bits with at least the subset of key bits.

In some examples, to support generating the bit vector, the CRC component 860 may be configured as or otherwise support a means for using the CRC polynomial to obtain a set of parity bits based on the set of data bits. In some examples, to support generating the bit vector, the masking component 870 may be configured as or otherwise support a means for masking the set of parity bits using at least the subset of key bits.

In some examples, to support masking the set of parity bits using at least the subset of key bits, the masking component 870 may be configured as or otherwise support a means for applying an XOR operation to the set of parity bits and at least the subset of key bits.

In some examples, to support generating the bit vector, the combining component 855 may be configured as or otherwise support a means for combining the set of data bits with the subset of key bits to obtain a set of input bits. In some examples, to support generating the bit vector, the CRC component 860 may be configured as or otherwise support a means for using the CRC polynomial to obtain a set of parity bits based on the set of input bits. In some examples, to support generating the bit vector, the interleaving component 865 may be configured as or otherwise support a means for interleaving the set of parity bits with a second subset of the set of key bits.

In some examples, to support generating the bit vector, the combining component 855 may be configured as or otherwise support a means for combining the set of data bits with the subset of key bits to obtain a set of input bits. In some examples, to support generating the bit vector, the CRC component 860 may be configured as or otherwise support a means for using the CRC polynomial to obtain a set of parity bits based on the set of input bits. In some examples, to support generating the bit vector, the masking component 870 may be configured as or otherwise support a means for masking the set of parity bits using a second subset of the set of key bits.

In some examples, to support obtaining the set of key bits, the key manager 825 may be configured as or otherwise support a means for determining one or more channel condition metrics for a channel between the first wireless device and the second wireless device, where a respective logic value of one or more key bits within the set of key bits is based on the one or more channel condition metrics.

In some examples, to support generating the encoded codeword, the encoding component 835 may be configured as or otherwise support a means for performing polar encoding on the bit vector.

Additionally or alternatively, the communications manager 820 may support wireless communications at a second wireless (e.g., a receiving device such as a base station or a UE) device in accordance with examples as disclosed herein. In some examples, the key manager 825 may be configured as or otherwise support a means for obtaining a set of key bits associated with a set of data bits. In some examples, the codeword component 840 may be configured as or otherwise support a means for receiving an encoded codeword from a first wireless device. The decoding component 845 may be configured as or otherwise support a means for obtaining a bit vector based on decoding the encoded codeword. The data manager 850 may be configured as or otherwise support a means for obtaining the set of data bits based on the bit vector, at least a subset of the set of key bits, and a CRC polynomial.

In some examples, to support obtaining the set of data bits, the combining component 855 may be configured as or otherwise support a means for combining the set of data bits with at least the subset of key bits to obtain a set of input bits. In some examples, to support obtaining the set of data bits, the CRC component 860 may be configured as or otherwise support a means for using the CRC polynomial and the set of parity bits to check the set of data bits for errors based on the set of input bits.

In some examples, to support combining the set of data bits with at least the subset of key bits, the combining component 855 may be configured as or otherwise support a means for padding the set of data bits with at least the subset of key bits.

In some examples, to support obtaining the set of data bits, the deinterleaving component 875 may be configured as or otherwise support a means for deinterleaving at least a portion of the bit vector to separate at least the subset of key bits from a set of parity bits. In some examples, to support obtaining the set of data bits, the CRC component 860 may be configured as or otherwise support a means for using the CRC polynomial and the set of parity bits to check the set of data bits for errors.

In some examples, to support obtaining the set of data bits, the unmasking component 880 may be configured as or otherwise support a means for unmasking at least a portion of the bit vector using at least the subset of key bits to obtain a set of parity bits. In some examples, to support obtaining the set of data bits, the CRC component 860 may be configured as or otherwise support a means for using the CRC polynomial and the set of parity bits to check the set of data bits for errors.

In some examples, to support unmasking the set of parity bits using at the subset of key bits, the unmasking component 880 may be configured as or otherwise support a means for applying an XOR operation to at least the portion of the bit vector and at least the subset of key bits.

In some examples, to support obtaining the set of data bits, the unmasking component 880 may be configured as or otherwise support a means for deinterleaving at least a portion of the bit vector to separate at least the subset of key bits from the set of parity bits. In some examples, to support obtaining the set of data bits, the combining component 855 may be configured as or otherwise support a means for combining the set of data bits with at least a second subset of the set of key bits to obtain a set of input bits. In some examples, to support obtaining the set of data bits, the CRC component 860 may be configured as or otherwise support a means for using the CRC polynomial and the set of parity bits to check the set of data bits for errors based on the set of input bits.

In some examples, to support obtaining the set of data bits, the unmasking component 880 may be configured as or otherwise support a means for unmasking at least a portion of the bit vector using at least the subset of key bits to obtain a set of parity bits. In some examples, to support obtaining the set of data bits, the combining component 855 may be configured as or otherwise support a means for combining the set of data bits with at least a second subset of the set of key bits to obtain a set of input bits. In some examples, to support obtaining the set of data bits, the CRC component 860 may be configured as or otherwise support a means for using the CRC polynomial and the set of parity bits to check the set of data bits for errors based on the set of input bits.

In some examples, to support obtaining the set of key bits, the key manager 825 may be configured as or otherwise support a means for determining one or more channel condition metrics for a channel between the first wireless device and the second wireless device, where a respective logic value of one or more key bits within the set of key bits is based on the one or more channel condition metrics.

In some examples, to support obtaining the bit vector, the decoding component 845 may be configured as or otherwise support a means for performing polar decoding on the bit vector.

Figure 9:
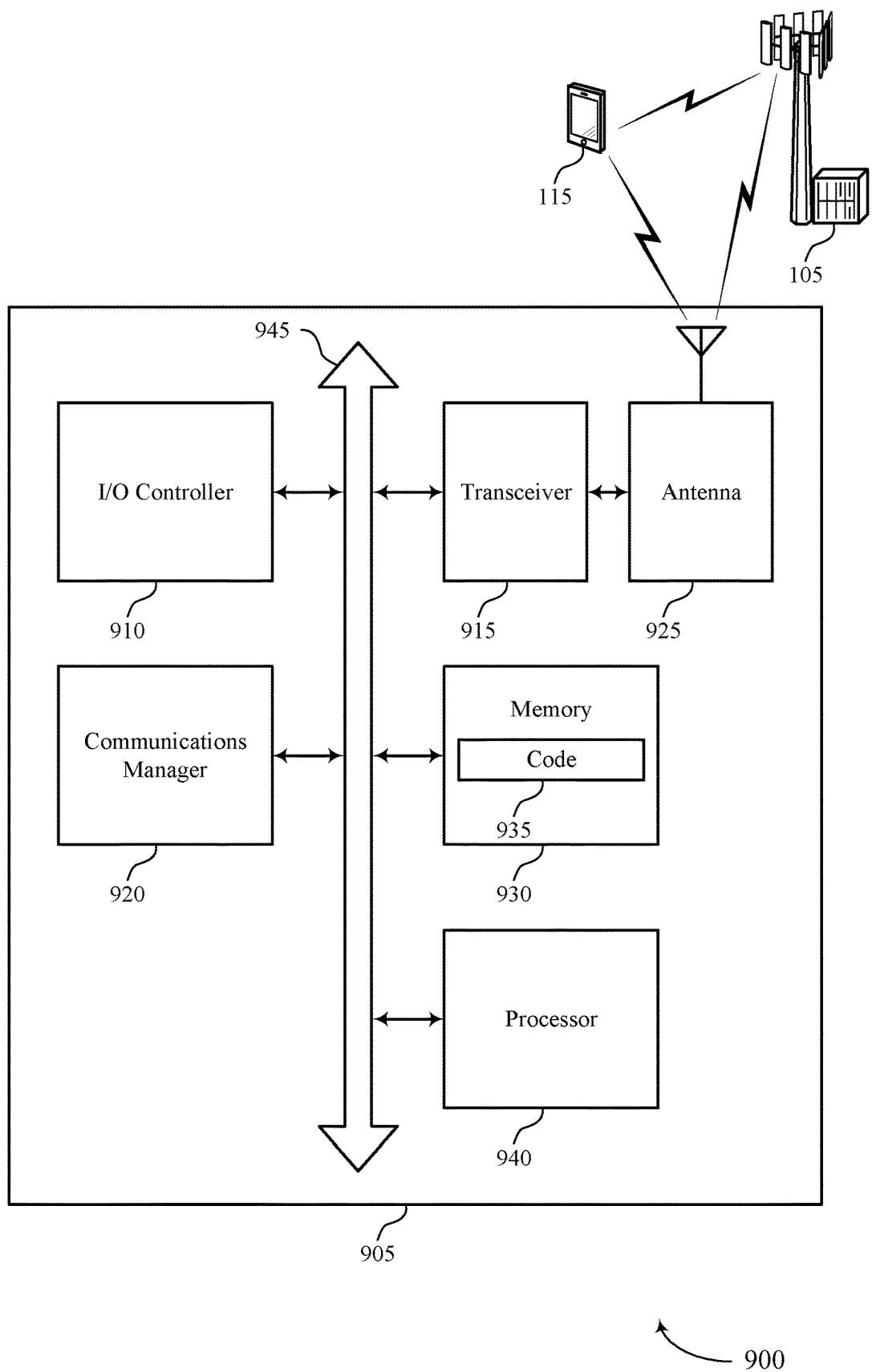
FIG. 9 shows a diagram of a system including a UE that supports enhanced security for wireless communications in accordance with aspects of the present disclosure.

FIG. 9 shows a diagram of a system 900 including a device 905 that supports enhanced security for wireless communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting enhanced security for wireless communications). For example, the device 905 or a component of the device 905 may include a processor 940 and memory 930 coupled to the processor 940, the processor 940 and memory 930 configured to perform various functions described herein.

The communications manager 920 may support wireless communications at a first wireless device (e.g., a transmitting UE) in accordance with examples as disclosed herein. For example, the communications manager 920 may be configured as or otherwise support a means for obtaining a set of key bits for protecting a set of data bits. The communications manager 920 may be configured as or otherwise support a means for generating a bit vector based on at least a subset of the set of key bits and a CRC polynomial. The communications manager 920 may be configured as or otherwise support a means for generating an encoded codeword based on the bit vector. The communications manager 920 may be configured as or otherwise support a means for transmitting the encoded codeword to a second wireless device.

Additionally or alternatively, the communications manager 920 may support wireless communications at a second wireless device (e.g., a receiving UE) in accordance with examples as disclosed herein. For example, the communications manager 920 may be configured as or otherwise support a means for obtaining a set of key bits associated with a set of data bits. The communications manager 920 may be configured as or otherwise support a means for receiving an encoded codeword from a first wireless device. The communications manager 920 may be configured as or otherwise support a means for obtaining a bit vector based on decoding the encoded codeword. The communications manager 920 may be configured as or otherwise support a means for obtaining the set of data bits based on the bit vector, at least a subset of the set of key bits, and a CRC polynomial.

By including or configuring the communications manager 920 in accordance with examples as described herein, the device 905 may support techniques for improved communication reliability, improved communication security, and improved coordination. To support such enhanced (e.g., physical layer) security, a device 905 may obtain cryptographic keys using channel metrics. In order for a malicious device to obtain the same cryptographic key, the malicious device must imitate the same channel conditions as is between the transmitting device and the intended receiving device. Imitating channel conditions may take more computation power at the malicious than cracking algorithms such as RSA and ECC in upper layer security. Therefore, security techniques as described herein may provide for improved communication security when compared to other security techniques.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhanced security for wireless communications as described herein, or the processor 940 and the memory 930 may be otherwise configured to perform or support such operations.

Figure 10:
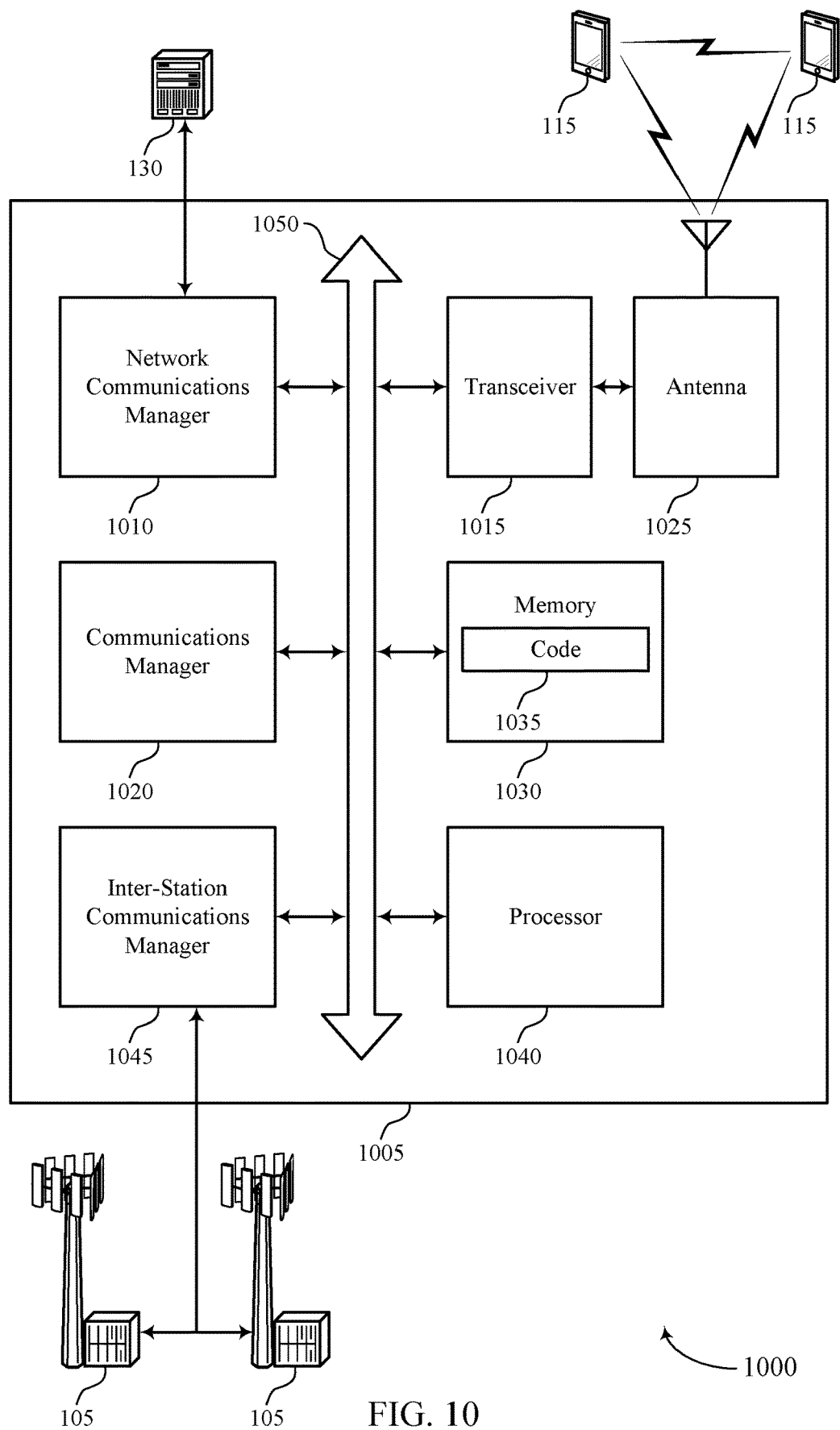
FIG. 10 shows a diagram of a system including a base station that supports enhanced security for wireless communications in accordance with aspects of the present disclosure.

FIG. 10 shows a diagram of a system 1000 including a device 1005 that supports enhanced security for wireless communications in accordance with aspects of the present disclosure. The device 1005 may be an example of or include the components of a device 605, a device 705, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced security for wireless communications). For example, the device 1005 or a component of the device 1005 may include a processor 1040 and memory 1030 coupled to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communications at a first wireless device (e.g., a transmitting base station) in accordance with examples as disclosed herein. For example, the communications manager 1020 may be configured as or otherwise support a means for obtaining a set of key bits for protecting a set of data bits. The communications manager 1020 may be configured as or otherwise support a means for generating a bit vector based on at least a subset of the set of key bits and a CRC polynomial. The communications manager 1020 may be configured as or otherwise support a means for generating an encoded codeword based on the bit vector. The communications manager 1020 may be configured as or otherwise support a means for transmitting the encoded codeword to a second wireless device.

Additionally or alternatively, the communications manager 1020 may support wireless communications at a second wireless device (e.g., a receiving base station) in accordance with examples as disclosed herein. For example, the communications manager 1020 may be configured as or otherwise support a means for obtaining a set of key bits associated with a set of data bits. The communications manager 1020 may be configured as or otherwise support a means for receiving an encoded codeword from a first wireless device. The communications manager 1020 may be configured as or otherwise support a means for obtaining a bit vector based on decoding the encoded codeword. The communications manager 1020 may be configured as or otherwise support a means for obtaining the set of data bits based on the bit vector, at least a subset of the set of key bits, and a CRC polynomial.

By including or configuring the communications manager 1020 in accordance with examples as described herein, the device 1005 may support techniques for improved communication reliability, improved communication security, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of enhanced security for wireless communications as described herein, or the processor 1040 and the memory 1030 may be otherwise configured to perform or support such operations.

Figure 11:
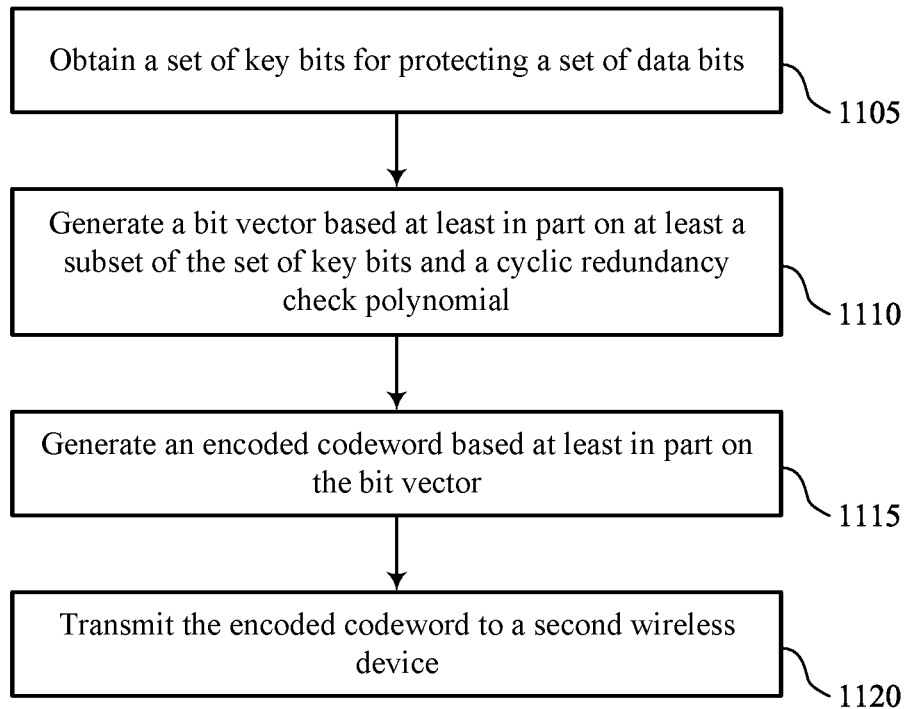
FIGS. 11 through 16 show flowcharts illustrating methods that support enhanced security for wireless communications in accordance with aspects of the present disclosure.

FIG. 11 shows a flowchart illustrating a method 1100 that supports enhanced security for wireless communications in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include obtaining a set of key bits for protecting a set of data bits. The operations of 1105 may be performed in accordance with examples as disclosed herein. In some examples, aspects of the operations of 1105 may be performed by a key manager 825 as described with reference to FIG. 8.

At 1110, the method may include generating a bit vector based on at least a subset of the set of key bits and a CRC polynomial. The operations of 1110 may be performed in accordance with examples as disclosed herein. In some examples, aspects of the operations of 1110 may be performed by a bit vector generator 830 as described with reference to FIG. 8.

At 1115, the method may include generating an encoded codeword based on the bit vector. The operations of 1115 may be performed in accordance with examples as disclosed herein. In some examples, aspects of the operations of 1115 may be performed by an encoding component 835 as described with reference to FIG. 8.

At 1120, the method may include transmitting the encoded codeword to a second wireless device. The operations of 1120 may be performed in accordance with examples as disclosed herein. In some examples, aspects of the operations of 1120 may be performed by a codeword component 840 as described with reference to FIG. 8.

Figure 12:
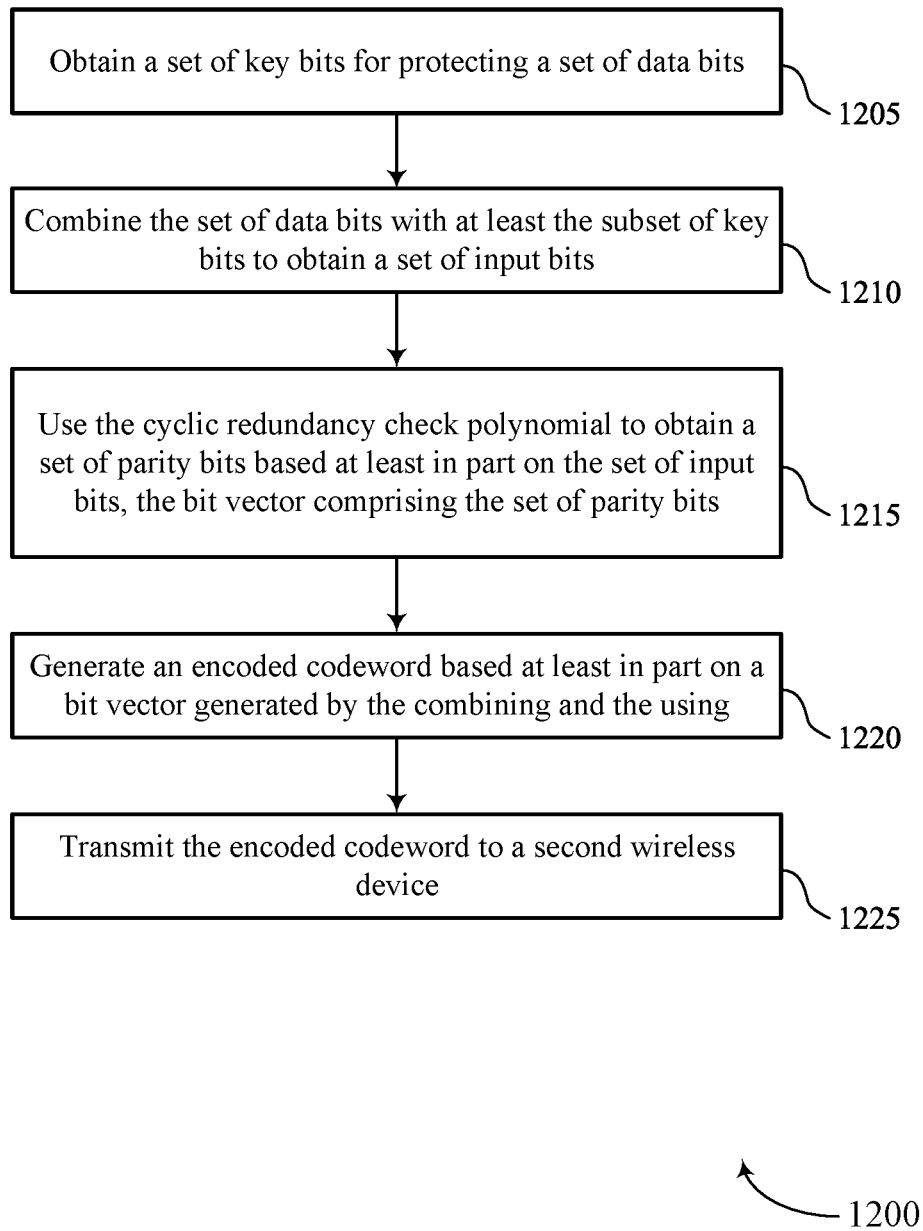

FIG. 12 shows a flowchart illustrating a method 1200 that supports enhanced security for wireless communications in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include obtaining a set of key bits for protecting a set of data bits. The operations of 1205 may be performed in accordance with examples as disclosed herein. In some examples, aspects of the operations of 1205 may be performed by a key manager 825 as described with reference to FIG. 8.

At 1210, the method may include combining the set of data bits with at least the subset of key bits to obtain a set of input bits. The operations of 1210 may be performed in accordance with examples as disclosed herein. In some examples, aspects of the operations of 1210 may be performed by a combining component 855 as described with reference to FIG. 8.

At 1215, the method may include using the CRC polynomial to obtain a set of parity bits based on the set of input bits, the bit vector including the set of parity bits. The operations of 1215 may be performed in accordance with examples as disclosed herein. In some examples, aspects of the operations of 1215 may be performed by an CRC component 860 as described with reference to FIG. 8.

At 1220, the method may include generating an encoded codeword based on the bit vector generated by the combining and the using. The operations of 1220 may be performed in accordance with examples as disclosed herein. In some examples, aspects of the operations of 1220 may be performed by an encoding component 835 as described with reference to FIG. 8.

At 1225, the method may include transmitting the encoded codeword to a second wireless device. The operations of 1225 may be performed in accordance with examples as disclosed herein. In some examples, aspects of the operations of 1225 may be performed by a codeword component 840 as described with reference to FIG. 8.

Figure 13:
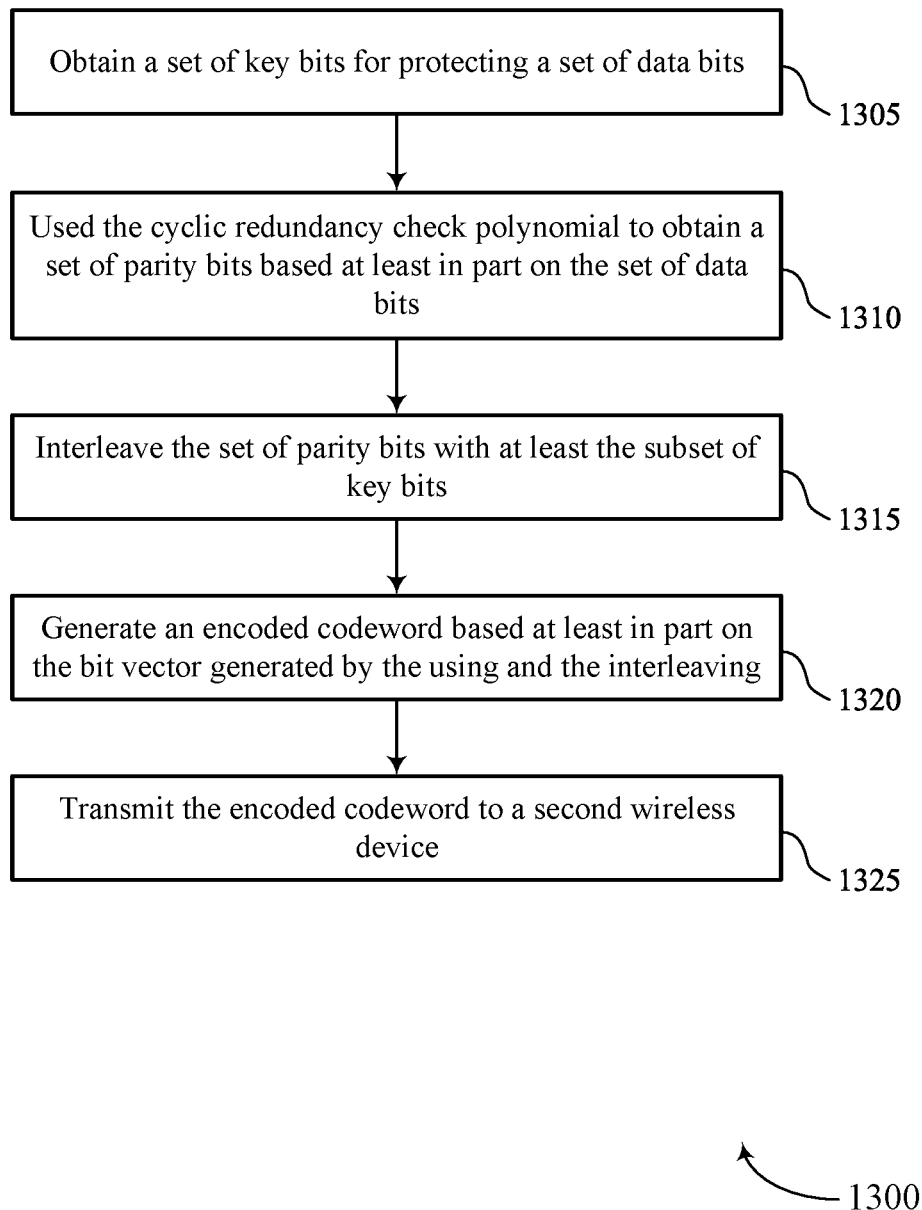

FIG. 13 shows a flowchart illustrating a method 1300 that supports enhanced security for wireless communications in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include obtaining a set of key bits for protecting a set of data bits. The operations of 1305 may be performed in accordance with examples as disclosed herein. In some examples, aspects of the operations of 1305 may be performed by a key manager 825 as described with reference to FIG. 8.

At 1310, the method may include using the CRC polynomial to obtain a set of parity bits based on the set of data bits. The operations of 1310 may be performed in accordance with examples as disclosed herein. In some examples, aspects of the operations of 1310 may be performed by an CRC component 860 as described with reference to FIG. 8.

At 1315, the method may include interleaving the set of parity bits with at least the subset of key bits. The operations of 1315 may be performed in accordance with examples as disclosed herein. In some examples, aspects of the operations of 1315 may be performed by an interleaving component 865 as described with reference to FIG. 8.

At 1320, the method may include generating an encoded codeword based on the bit vector generated by the using and the interleaving. The operations of 1320 may be performed in accordance with examples as disclosed herein. In some examples, aspects of the operations of 1320 may be performed by an encoding component 835 as described with reference to FIG. 8.

At 1325, the method may include transmitting the encoded codeword to a second wireless device. The operations of 1325 may be performed in accordance with examples as disclosed herein. In some examples, aspects of the operations of 1325 may be performed by a codeword component 840 as described with reference to FIG. 8.

Figure 14:
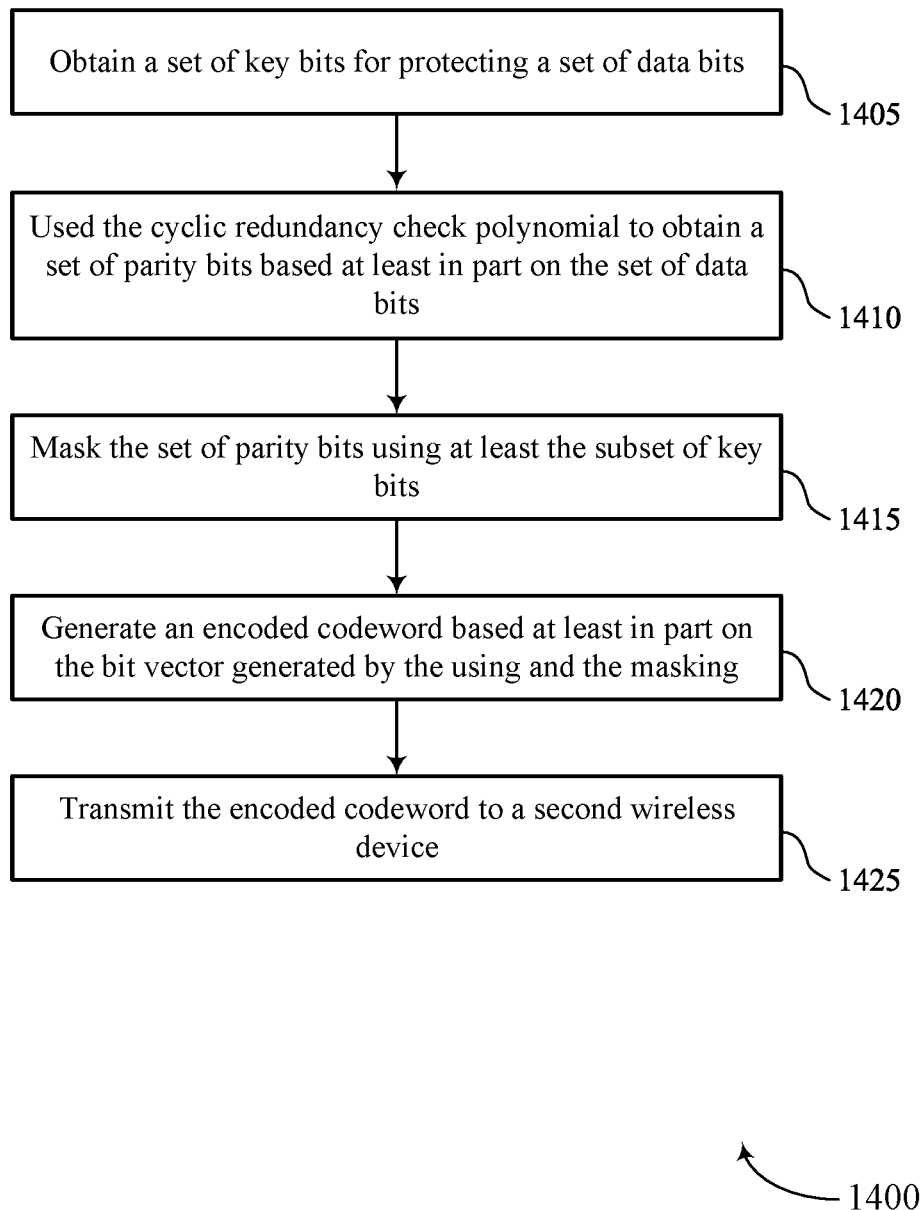

FIG. 14 shows a flowchart illustrating a method 1400 that supports enhanced security for wireless communications in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include obtaining a set of key bits for protecting a set of data bits. The operations of 1405 may be performed in accordance with examples as disclosed herein. In some examples, aspects of the operations of 1405 may be performed by a key manager 825 as described with reference to FIG. 8.

At 1410, the method may include using the CRC polynomial to obtain a set of parity bits based on the set of data bits. The operations of 1410 may be performed in accordance with examples as disclosed herein. In some examples, aspects of the operations of 1410 may be performed by an CRC component 860 as described with reference to FIG. 8.

At 1415, the method may include masking the set of parity bits using at least the subset of key bits. The operations of 1415 may be performed in accordance with examples as disclosed herein. In some examples, aspects of the operations of 1415 may be performed by a masking component 870 as described with reference to FIG. 8.

At 1420, the method may include generating an encoded codeword based on the bit vector generated by the using and the masking. The operations of 1420 may be performed in accordance with examples as disclosed herein. In some examples, aspects of the operations of 1420 may be performed by an encoding component 835 as described with reference to FIG. 8.

At 1425, the method may include transmitting the encoded codeword to a second wireless device. The operations of 1425 may be performed in accordance with examples as disclosed herein. In some examples, aspects of the operations of 1425 may be performed by a codeword component 840 as described with reference to FIG. 8.

Figure 15:
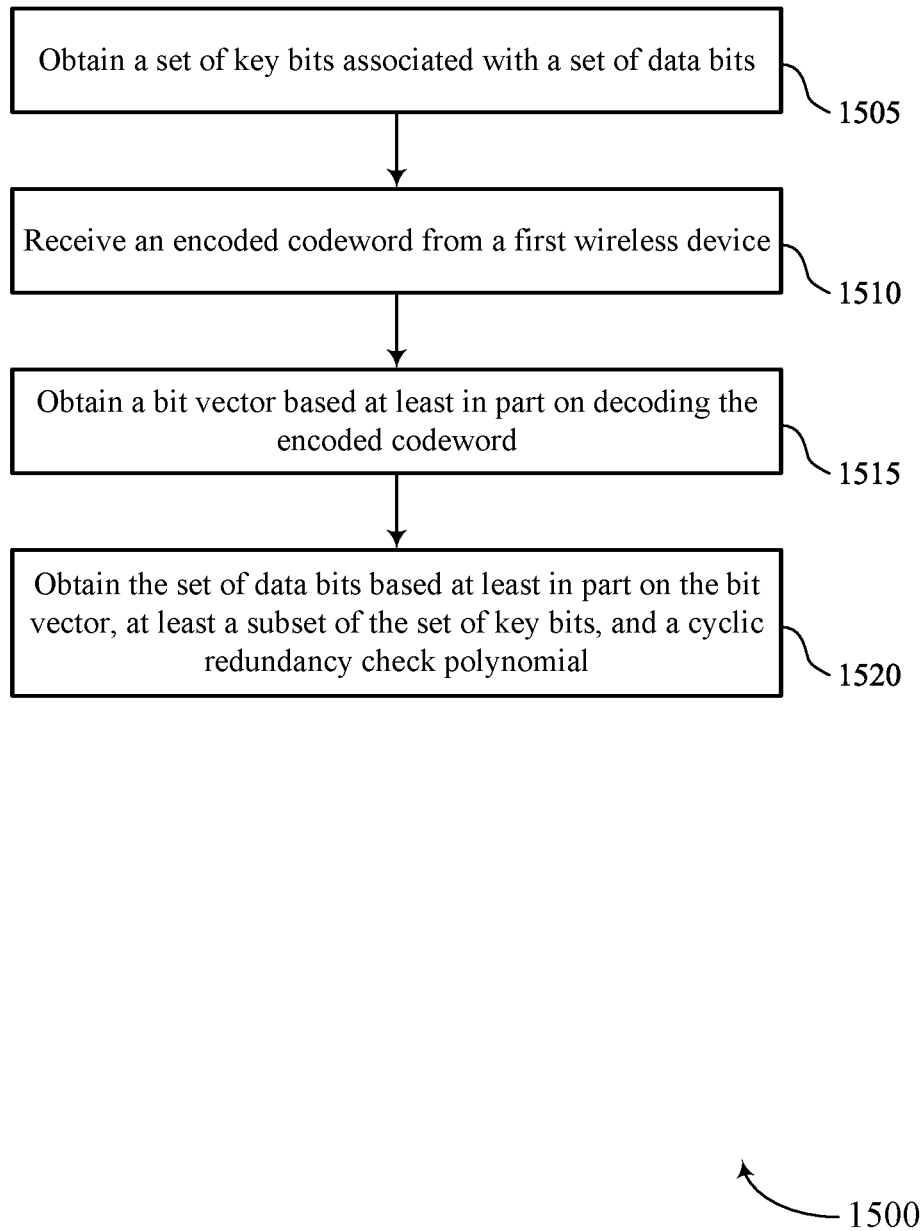

FIG. 15 shows a flowchart illustrating a method 1500 that supports enhanced security for wireless communications in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include obtaining a set of key bits associated with a set of data bits. The operations of 1505 may be performed in accordance with examples as disclosed herein. In some examples, aspects of the operations of 1505 may be performed by a key manager 825 as described with reference to FIG. 8.

At 1510, the method may include receiving an encoded codeword from a first wireless device. The operations of 1510 may be performed in accordance with examples as disclosed herein. In some examples, aspects of the operations of 1510 may be performed by a codeword component 840 as described with reference to FIG. 8.

At 1515, the method may include obtaining a bit vector based on decoding the encoded codeword. The operations of 1515 may be performed in accordance with examples as disclosed herein. In some examples, aspects of the operations of 1515 may be performed by a decoding component 845 as described with reference to FIG. 8.

At 1520, the method may include obtaining the set of data bits based on the bit vector, at least a subset of the set of key bits, and a CRC polynomial. The operations of 1520 may be performed in accordance with examples as disclosed herein. In some examples, aspects of the operations of 1520 may be performed by a data manager 850 as described with reference to FIG. 8.

Figure 16:
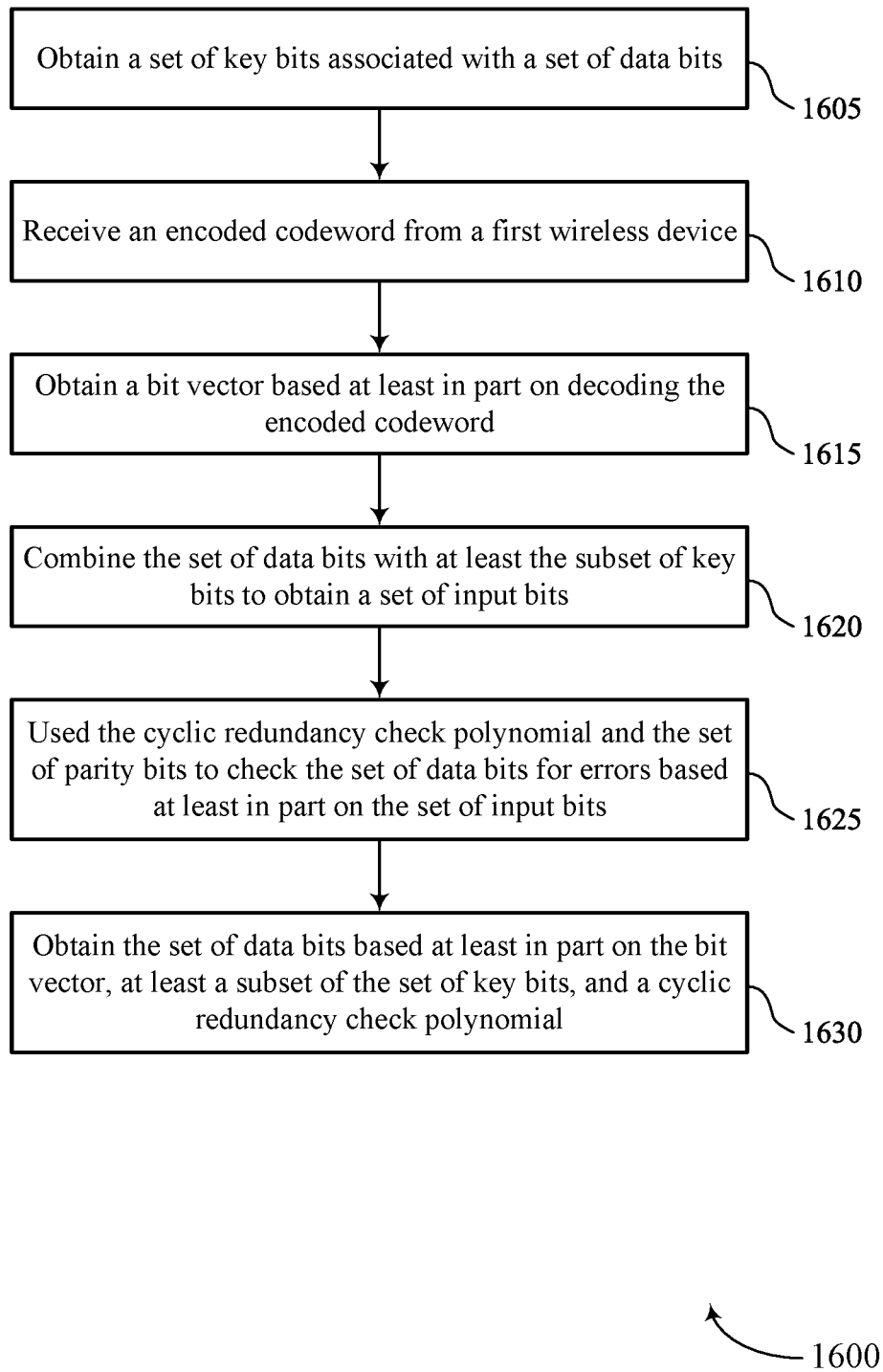

FIG. 16 shows a flowchart illustrating a method 1600 that supports enhanced security for wireless communications in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include obtaining a set of key bits associated with a set of data bits. The operations of 1605 may be performed in accordance with examples as disclosed herein. In some examples, aspects of the operations of 1605 may be performed by a key manager 825 as described with reference to FIG. 8.

At 1610, the method may include receiving an encoded codeword from a first wireless device. The operations of 1610 may be performed in accordance with examples as disclosed herein. In some examples, aspects of the operations of 1610 may be performed by a codeword component 840 as described with reference to FIG. 8.

At 1615, the method may include obtaining a bit vector based on decoding the encoded codeword. The operations of 1615 may be performed in accordance with examples as disclosed herein. In some examples, aspects of the operations of 1615 may be performed by a decoding component 845 as described with reference to FIG. 8.

At 1620, the method may include combining the set of data bits with at least the subset of key bits to obtain a set of input bits. The operations of 1620 may be performed in accordance with examples as disclosed herein. In some examples, aspects of the operations of 1620 may be performed by a combining component 855 as described with reference to FIG. 8.

At 1625, the method may include using the CRC polynomial and the set of parity bits to check the set of data bits for errors based on the set of input bits. The operations of 1625 may be performed in accordance with examples as disclosed herein. In some examples, aspects of the operations of 1625 may be performed by an CRC component 860 as described with reference to FIG. 8.

At 1630, the method may include obtaining the set of data bits based on the bit vector, at least a subset of the set of key bits, and a CRC polynomial. The operations of 1630 may be performed in accordance with examples as disclosed herein. In some examples, aspects of the operations of 1630 may be performed by a data manager 850 as described with reference to FIG. 8.

The following provides an overview of aspects of the present disclosure:

Aspect 1: A method for wireless communications at a first wireless device, comprising: obtaining a set of key bits for protecting a set of data bits; generating a bit vector based at least in part on at least a subset of the set of key bits and a CRC polynomial; generating an encoded codeword based at least in part on the bit vector; and transmitting the encoded codeword to a second wireless device.

Aspect 2: The method of aspect 1, wherein generating the bit vector comprises: combining the set of data bits with at least the subset of key bits to obtain a set of input bits; and using the CRC polynomial to obtain a set of parity bits based at least in part on the set of input bits, the bit vector comprising the set of parity bits.

Aspect 3: The method of aspect 2, wherein combining the set of data bits with at least the subset of key bits comprises: padding the set of data bits with at least the subset of key bits.

Aspect 4: The method of aspect 3, wherein the set of input bits further comprises one or more null bits.

Aspect 5: The method of aspect 1, wherein generating the bit vector comprises: using the CRC polynomial to obtain a set of parity bits based at least in part on the set of data bits; and interleaving the set of parity bits with at least the subset of key bits.

Aspect 6: The method of aspect 1, wherein generating the bit vector comprises: using the CRC polynomial to obtain a set of parity bits based at least in part on the set of data bits; and masking the set of parity bits using at least the subset of key bits.

Aspect 7: The method of aspect 6, wherein masking the set of parity bits using at least the subset of key bits comprises: applying an exclusive or (XOR) operation to the set of parity bits and at least the subset of key bits.

Aspect 8: The method of aspect 1, wherein generating the bit vector comprises: combining the set of data bits with the subset of key bits to obtain a set of input bits; using the CRC polynomial to obtain a set of parity bits based at least in part on the set of input bits; and interleaving the set of parity bits with a second subset of the set of key bits.

Aspect 9: The method of aspect 1, wherein generating the bit vector comprises: combining the set of data bits with the subset of key bits to obtain a set of input bits; using the CRC polynomial to obtain a set of parity bits based at least in part on the set of input bits; and masking the set of parity bits using a second subset of the set of key bits.

Aspect 10: The method of any of the aspects 1 through 9, wherein obtaining the set of key bits comprises: determining one or more channel condition metrics for a channel between the first wireless device and the second wireless device, wherein a respective logic value of one or more key bits within the set of key bits is based at least in part on the one or more channel condition metrics.

Aspect 11: The method of any of aspects 1 through 10, wherein generating the encoded codeword comprises: performing polar encoding on the bit vector.

Aspect 12: A method for wireless communications at a second wireless device, comprising: obtaining a set of key bits associated with a set of data bits; receiving an encoded codeword from a first wireless device; obtaining a bit vector based at least in part on decoding the encoded codeword; and obtaining the set of data bits based at least in part on the bit vector, at least a subset of the set of key bits, and a CRC polynomial.

Aspect 13: The method of aspect 12, wherein the bit vector comprises the set of data bits and a set of parity bits, and wherein obtaining the set of data bits comprises: combining the set of data bits with at least the subset of key bits to obtain a set of input bits; and using the CRC polynomial and the set of parity bits to check the set of data bits for errors based at least in part on the set of input bits.

Aspect 14: The method of aspect 13, wherein combining the set of data bits with at least the subset of key bits comprises: padding the set of data bits with at least the subset of key bits.

Aspect 15: The method of aspect 12, wherein obtaining the set of data bits comprises: deinterleaving at least a portion of the bit vector to separate at least the subset of key bits from a set of parity bits; and using the CRC polynomial and the set of parity bits to check the set of data bits for errors.

Aspect 16: The method of aspect 12, wherein obtaining the set of data bits comprises: unmasking at least a portion of the bit vector using at least the subset of key bits to obtain a set of parity bits; and using the CRC polynomial and the set of parity bits to check the set of data bits for errors.

Aspect 17: The method of aspect 16, wherein unmasking the set of parity bits using at the subset of key bits comprises: applying an XOR operation to at least the portion of the bit vector and at least the subset of key bits.

Aspect 18: The method of aspect 12, wherein the bit vector comprises the set of data bits and a set of parity bits, and wherein obtaining the set of data bits comprises: deinterleaving at least a portion of the bit vector to separate at least the subset of key bits from the set of parity bits; combining the set of data bits with at least a second subset of the set of key bits to obtain a set of input bits; and using the CRC polynomial and the set of parity bits to check the set of data bits for errors based at least in part on the set of input bits.

Aspect 19: The method of aspect 12, wherein obtaining the set of data bits comprises: unmasking at least a portion of the bit vector using at least the subset of key bits to obtain a set of parity bits; combining the set of data bits with at least a second subset of the set of key bits to obtain a set of input bits; and using the CRC polynomial and the set of parity bits to check the set of data bits for errors based at least in part on the set of input bits.

Aspect 20: The method of any of aspects 12 through 19, wherein obtaining the set of key bits comprises: determining one or more channel condition metrics for a channel between the first wireless device and the second wireless device, wherein a respective logic value of one or more key bits within the set of key bits is based at least in part on the one or more channel condition metrics.

Aspect 21: The method of any of aspects 12 through 20, wherein obtaining the bit vector comprises: performing polar decoding on the bit vector.

Aspect 22: An apparatus for wireless communications at a first wireless device, comprising a processor; memory coupled with the processor; and instructions stored in the memory and executable by the processor to cause the apparatus to perform a method of any of aspects 1 through 11.

Aspect 23: An apparatus for wireless communications at a first wireless device, comprising at least one means for performing a method of any of aspects 1 through 11.

Aspect 24: A non-transitory computer-readable medium storing code for wireless communications at a first wireless device, the code comprising instructions executable by a processor to perform a method of any of aspects 1 through 11.

Aspect 25: An apparatus for wireless communications at a second wireless device, comprising a processor; memory coupled with the processor; and instructions stored in the memory and executable by the processor to cause the apparatus to perform a method of any of aspects 12 through 21.

Aspect 26: An apparatus for wireless communications at a second wireless device, comprising at least one means for performing a method of any of aspects 12 through 21.

Aspect 27: A non-transitory computer-readable medium storing code for wireless communications at a second wireless device, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   obtaining a set of key bits for protecting a set of data bits;
   generating a bit vector based at least in part on at least a subset of the set of key bits and a cyclic redundancy check polynomial;
   using the cyclic redundancy check polynomial to obtain a set of parity bits based at least in part on a set of input bits, the bit vector comprising the set of parity bits;
   generating an encoded codeword based at least in part on the bit vector; and
   transmitting the encoded codeword to a second wireless device.

2. The method of claim 1, wherein generating the bit vector comprises:
   combining the set of data bits with at least the subset of the set of key bits to obtain the set of input bits.

3. The method of claim 2, wherein combining the set of data bits with at least the subset of the set of key bits comprises:
   padding the set of data bits with at least the subset of the set of key bits.

4. The method of claim 3, wherein the set of input bits further comprises one or more null bits.

5. The method of claim 1, wherein generating the bit vector comprises:
   combining the set of data bits with the subset of the set of key bits to obtain the set of input bits; and
   interleaving the set of parity bits with a second subset of the set of key bits.

6. The method of claim 1, wherein generating the bit vector comprises:
   combining the set of data bits with the subset of the set of key bits to obtain the set of input bits; and
   masking the set of parity bits using a second subset of the set of key bits.

7. The method of claim 1, wherein obtaining the set of key bits comprises:
   determining one or more channel condition metrics for a channel between the first wireless device and the second wireless device, wherein a respective logic value of one or more key bits within the set of key bits is based at least in part on the one or more channel condition metrics.

8. The method of claim 1, wherein generating the encoded codeword comprises:
   performing polar encoding on the bit vector.

9. A method for wireless communications at a second wireless device, comprising:
   obtaining a set of key bits associated with a set of data bits;
   receiving an encoded codeword from a first wireless device;
   obtaining a bit vector based at least in part on decoding the encoded codeword;
   obtaining the set of data bits based at least in part on the bit vector, at least a subset of the set of key bits, and a cyclic redundancy check polynomial; and
   using the cyclic redundancy check polynomial and a set of parity bits to check the set of data bits for errors.

10. The method of claim 9, wherein the bit vector comprises the set of data bits and the set of parity bits, and wherein obtaining the set of data bits comprises:
    combining the set of data bits with at least the subset of the set of key bits to obtain a set of input bits; and
    checking the set of data bits for errors based at least in part on the set of input bits.

11. The method of claim 10, wherein combining the set of data bits with at least the subset of the set of key bits comprises:
    padding the set of data bits with at least the subset of the set of key bits.

12. The method of claim 9, wherein obtaining the set of data bits comprises:
    deinterleaving at least a portion of the bit vector to separate at least the subset of the set of key bits from the set of parity bits.

13. The method of claim 9, wherein obtaining the set of data bits comprises:
    unmasking at least a portion of the bit vector using at least the subset of the set of key bits to obtain the set of parity bits.

14. The method of claim 13, wherein unmasking the set of parity bits using at the subset of the set of key bits comprises:
    applying an exclusive or (XOR) operation to at least the portion of the bit vector and at least the subset of the set of key bits.

15. The method of claim 9, wherein the bit vector comprises the set of data bits and the set of parity bits, and wherein obtaining the set of data bits comprises:
    deinterleaving at least a portion of the bit vector to separate at least the subset of the set of key bits from the set of parity bits;
    combining the set of data bits with at least a second subset of the set of key bits to obtain a set of input bits; and
    checking the set of data bits for error based at least in part on the set of input bits.

16. The method of claim 9, wherein obtaining the set of data bits comprises:
    unmasking at least a portion of the bit vector using at least the subset of the set of key bits to obtain the set of parity bits;
    combining the set of data bits with at least a second subset of the set of key bits to obtain a set of input bits; and
    checking the set of data bits for errors based at least in part on the set of input bits.

17. The method of claim 9, wherein obtaining the set of key bits comprises:
    determining one or more channel condition metrics for a channel between the first wireless device and the second wireless device, wherein a respective logic value of one or more key bits within the set of key bits is based at least in part on the one or more channel condition metrics.

18. The method of claim 9, wherein obtaining the bit vector comprises:
performing polar decoding on the bit vector.

19. An apparatus for wireless communications at a first wireless device, comprising:
one or more processors;
one or more memories coupled with the one or more processors; and
instructions stored in the one or more memories and executable by the one or more processors to cause the apparatus to:
obtain a set of key bits for protecting a set of data bits;
generate a bit vector based at least in part on at least a subset of the set of key bits and a cyclic redundancy check polynomial;
use the cyclic redundancy check polynomial to obtain a set of parity bits based at least in part on a set of input bits, the bit vector comprising the set of parity bits;
generate an encoded codeword based at least in part on the bit vector; and
transmit the encoded codeword to a second wireless device.

20. The apparatus of claim 19, wherein the instructions to generate the bit vector are executable by the one or more processors to cause the apparatus to:
combine the set of data bits with at least the subset of the set of key bits to obtain the set of input bits.

21. The apparatus of claim 19, wherein the instructions to generate the bit vector are executable by the one or more processors to cause the apparatus to:
combine the set of data bits with the subset of the set of key bits to obtain the set of input bits; and
interleave the set of parity bits with a second subset of the set of key bits.

22. An apparatus for wireless communications at a second wireless device, comprising:
one or more processors;
one or more memories coupled with the one or more processors; and
instructions stored in the one or more memories and executable by the one or more processors to cause the apparatus to:
obtain a set of key bits associated with a set of data bits;
receive an encoded codeword from a first wireless device;
obtain a bit vector based at least in part on decoding the encoded codeword;
obtain the set of data bits based at least in part on the bit vector, at least a subset of the set of key bits, and a cyclic redundancy check polynomial; and
use the cyclic redundancy check polynomial and a set of parity bits to check the set of data bits for errors.

23. The apparatus of claim 22, wherein the bit vector comprises the set of data bits and the set of parity bits, and wherein the instructions to obtain the set of data bits are executable by the one or more processors to cause the apparatus to:
combine the set of data bits with at least the subset of the set of key bits to obtain a set of input bits; and
check the set of data bits for errors based at least in part on the set of input bits.

24. The apparatus of claim 22, wherein the instructions to obtain the set of data bits are executable by the one or more processors to cause the apparatus to:
deinterleave at least a portion of the bit vector to separate at least the subset of the set of key bits from a set of parity.

25. The apparatus of claim 22, wherein the instructions to obtain the set of data bits are executable by the one or more processors to cause the apparatus to:
unmask at least a portion of the bit vector using at least the subset of the set of key bits to obtain a set of parity bits.

* * * * *